United States Patent
Rangarajan et al.

(10) Patent No.: US 10,033,756 B1
(45) Date of Patent: Jul. 24, 2018

(54) METHODS AND SYSTEMS FOR HOLISTICALLY ATTESTING THE TRUST OF HETEROGENEOUS COMPUTE RESOURCES

(71) Applicant: HyTrust, Inc., Mountain View, CA (US)

(72) Inventors: Govindarajan Rangarajan, Sunnyvale, CA (US); Hemma Prafullchandra, Mountain View, CA (US); Sean Patrick Murphy, San Francisco, CA (US); Laxmana Kumar Bhavandla, Nashua, NH (US)

(73) Assignee: HyTrust, Inc., Mountain View, CA (US)

( * ) Notice: Subject to any disclaimer, the term of this patent is extended or adjusted under 35 U.S.C. 154(b) by 0 days.

(21) Appl. No.: 15/795,053

(22) Filed: Oct. 26, 2017

(51) Int. Cl.
*H04L 12/24* (2006.01)
*G06F 17/30* (2006.01)
(Continued)

(52) U.S. Cl.
CPC ...... *H04L 63/1433* (2013.01); *G06F 9/45541* (2013.01); *G06F 9/45558* (2013.01); *H04L 63/105* (2013.01); *G06F 2009/45595* (2013.01)

(58) Field of Classification Search
CPC ............... H04L 63/1433; H04L 63/105; G06F 9/45558; G06F 9/45541; G06F 2009/45595
See application file for complete search history.

(56) References Cited

U.S. PATENT DOCUMENTS

| | | | | |
|---|---|---|---|---|
| 6,301,668 B1 * | 10/2001 | Gleichauf | ............... | H04L 41/12 726/22 |
| 6,324,656 B1 * | 11/2001 | Gleichauf | ............... | H04L 41/12 714/37 |

(Continued)

FOREIGN PATENT DOCUMENTS

| CN | 104081713 A | 10/2014 |
|---|---|---|
| EP | 2616982 A1 | 7/2013 |

OTHER PUBLICATIONS

Li, Xiaoyong, and Junping Du. "Adaptive and attribute-based trust model for service-level agreement guarantee in cloud computing." IET Information Security 7.1 (2013): 39-50. (Year: 2013).*

(Continued)

*Primary Examiner* — Michael J Simitoski
(74) *Attorney, Agent, or Firm* — Ascenda Law Group, PC

(57) ABSTRACT

A trust management system may be configured to compute a trust level for a compute resource based on a trust manifest corresponding to compute resource. Based on the construction of a trust manifest for each class of compute resources, a trust level may be computed for a wide range of compute resources, including bare-metal hosts, hypervisor hosts, virtual machines and containers. A trust manifest may specify one or more inputs for calculating the trust level, as well as how the inputs are to be processed to arrive at the trust level. The one or more inputs may include integrity measurements determined in accordance with one or more integrity measurement methods and security assessments determined in accordance with one or more security assessment methods. The inputs for the trust level calculation may be evaluated by one or more rule statements specified in the trust manifest, the evaluation of which returns the trust level for the compute resource.

27 Claims, 12 Drawing Sheets

(51) Int. Cl.
*H04L 29/06* (2006.01)
*G06F 9/455* (2018.01)
*G06F 12/14* (2006.01)

(56) References Cited

U.S. PATENT DOCUMENTS

| | | | |
|---|---|---|---|
| 7,191,464 B2 | 3/2007 | Cromer et al. | |
| 7,340,776 B2* | 3/2008 | Zobel | G06F 21/577 |
| | | | 713/188 |
| 7,664,845 B2* | 2/2010 | Kurtz | G02B 5/3083 |
| | | | 705/7.11 |
| 7,809,667 B1* | 10/2010 | Yehuda | G06F 21/52 |
| | | | 706/47 |
| 8,065,712 B1* | 11/2011 | Cheng | H04L 63/105 |
| | | | 726/1 |
| 8,091,117 B2* | 1/2012 | Williams | H04L 41/0853 |
| | | | 726/3 |
| 8,166,552 B2 | 4/2012 | Prafullchandra et al. | |
| 8,176,336 B1 | 5/2012 | Mao et al. | |
| 8,539,589 B2 | 9/2013 | Prafullchandra et al. | |
| 8,584,247 B1* | 11/2013 | Patil | G06Q 10/101 |
| | | | 726/25 |
| 8,966,578 B1 | 2/2015 | Belov et al. | |
| 9,256,742 B2 | 2/2016 | Raghuram et al. | |
| 9,262,188 B1* | 2/2016 | Yang | G06F 9/45533 |
| 9,313,281 B1* | 4/2016 | Lietz | H04L 67/16 |
| 9,386,045 B2 | 7/2016 | Kgil et al. | |
| 9,450,940 B2 | 9/2016 | Belov et al. | |
| 9,734,349 B1 | 8/2017 | Prafullchandra et al. | |
| 2002/0104014 A1* | 8/2002 | Zobel | G06F 21/577 |
| | | | 726/26 |
| 2006/0117184 A1* | 6/2006 | Bleckmann | H04L 9/3247 |
| | | | 713/176 |
| 2007/0143629 A1* | 6/2007 | Hardjono | H04L 63/0823 |
| | | | 713/189 |
| 2007/0233854 A1* | 10/2007 | Bukovec | H04L 43/045 |
| | | | 709/224 |
| 2008/0046581 A1* | 2/2008 | Molina | H04L 63/08 |
| | | | 709/229 |
| 2008/0046752 A1* | 2/2008 | Berger | H04L 9/3271 |
| | | | 713/186 |
| 2010/0325628 A1* | 12/2010 | Haga | G06F 21/575 |
| | | | 718/1 |
| 2011/0010543 A1* | 1/2011 | Schmidt | H04W 12/10 |
| | | | 713/168 |
| 2011/0107089 A1* | 5/2011 | Koottayi | H04L 63/102 |
| | | | 713/156 |
| 2013/0191643 A1 | 7/2013 | Song et al. | |
| 2014/0122873 A1* | 5/2014 | Deutsch | H04L 63/20 |
| | | | 713/158 |
| 2014/0283031 A1* | 9/2014 | Eksten | G06F 21/51 |
| | | | 726/22 |
| 2016/0119336 A1 | 4/2016 | Dyer et al. | |
| 2016/0241597 A1* | 8/2016 | Falk | G06F 21/62 |
| 2017/0270304 A1* | 9/2017 | Li | G06F 21/577 |

OTHER PUBLICATIONS

Ruan, Anbang, and Andrew Martin. "Repcloud: achieving fine-grained cloud tcb attestation with reputation systems." Proceedings of the sixth ACM workshop on Scalable trusted computing. ACM, 2011. (Year: 2011).*
Blaze; et al., "The Role of Trust Management in Distributed Systems Security", Secure Internet Programming (1999), 27 pages.
Bailey; et al., "Virtual Container Attestation: Customized trusted containers for on-demand computing.", Dartmouth Computer Science Technical Report TR2010-674 (Jun. 4, 2010), 61 pages.
Rouse, "compensating control (alternative control)", TechTarget, WhatIs.com (Nov. 14, 2016), retrieved from: http://whatis.techtarget.com/definition/compensating-control?vgnextfmt=print, 1 page.
"Vulnerability Static Analysis for Containers", GitHub (accessed Oct. 23, 2017), retrieved from: https://github.com/coreos/clair, 3 pages.
"Unified Extensible Firmware Interface", Wikipedia (last edited Oct. 20, 2017), retrieved from: https://en.wikipedia.org/wiki/Unified_Extensible_Firmware_Interface, 21 pages.
"Trustonic Secured Platforms (TSP) An open Trusted Execution Environment for smart devices", Trustonic website (2017), retrived from: https://www.trustonic.com/solutions/trustonic-secured-platforms-tsp/, 7 pages.
"Trusted Platform Module", Wikipedia (last edited Oct. 21, 2017), retrieved from: https://en.wikipedia.org/wiki/Trusted_Platform_Module, 11 pages.
"Trusted Execution Technology", Wikipedia (last edited Sep. 22, 2017), retrieved from: https://en.wikipedia.org/wiki/Trusted_Execution_Technology, 5 pages.
"National Vulnerability Database", NIST (accessed Oct. 23, 2017), retrieved from: https://nvd.nist.gov/vuln, 2 pages.
"Hardware-based Technology for Enhancing Server Platform Security", Intel® Trusted Execution Technology, White Paper (accessed Oct. 23, 2017), 8 pages.

* cited by examiner

METHODS AND SYSTEMS FOR HOLISTICALLY ATTESTING THE TRUST OF HETEROGENEOUS COMPUTE RESOURCES

FIELD OF THE INVENTION

The present invention relates to determining the trustworthiness (e.g., a trust level) of a compute resource, and more particularly relates to a generic and holistic approach for attesting the overall trust of disparate compute resources, such as bare-metal hosts, hypervisor hosts, virtual machines and containers in a consistent manner.

BACKGROUND

Currently, various integrity measurement mechanisms, such as Trusted Execution Technology (TXT) from Intel Corp.™ of Santa Clara, Calif. and Unified Extensible Firmware Interface (UEFI) from the Unified EFI Forum of Beaverton, Oreg. can be used to attest the trust for a select class of systems, such as a host OS system or a hypervisor that runs on a particular type of hardware. Also, approaches are being developed by various other enterprises or vendors for establishing trust for other types of compute resources such as virtual machines, containers, etc. These trust attestations are typically based on good known measurements of key software and hardware configuration information. Furthermore, there are siloed solutions and/or products that can be used to establish the trust of a compute resource based on other attributes and useful context information, such as application profiling of what is running within the compute resource, what is its current security posture, what other computing systems communicate with it, what it relies on for storage, etc.

SUMMARY OF THE INVENTION

In this era of cloud computing, organizations typically leverage infrastructure as a service (IaaS) from one or more cloud vendors for their computing needs. As workloads such as virtual machines and containers move from one cloud environment to another, it is becoming increasingly important to make sure that such compute resources are trusted (i.e., that there is a guarantee or assurance of their trustworthiness). Discussed herein is a trust management system to holistically attest the trust of a wide variety of heterogeneous compute resources. This approach provides a suitable abstraction and normalization that leverages, integrates and/or co-exists with existing mechanisms and/or approaches to attest the trustworthiness of any compute resource.

In accordance with one embodiment of the invention, a trust manifest provides specifications for the computation of a trust level for a class of compute resources, in which the compute resources within the same class are similar to one another (e.g., have the same resource type, have same characterizing attributes, etc.). A trust manifest exists for each class of compute resources (and if not already defined, a new trust manifest is created), such that regardless of which class a compute resource belongs to, a trust manifest can be selected for that compute resource. The selection of a trust manifest may depend on the closeness of match between attributes of a trust manifest and attributes which characterize the compute resource, as well as an operational context of the compute resource.

More specifically, the trust manifest may specify one or more inputs for computing the trust level, and how these inputs are to be processed to arrive at the trust level. The inputs may include integrity measurements measured in accordance with one or more integrity measurement methods (e.g., trusted execution technology (Intel TXT), unified extensible firmware interface (UEFI) or Docker Notary) specified in the trust manifest. The inputs may also include security and compliance assessments performed in accordance with various security assessment methods (e.g., the Clair open source static vulnerability analyzer, Qualys container security, a whitelist of penetration tested/assessed compute resources, etc.).

In addition to specifying the inputs for computing the trust level of a compute resource, the trust manifest may also specify one or more rule statements and an evaluation logic for evaluating the one or more rule statements, the combination of which (rule statements and evaluation logic) may be used to process the inputs to arrive at the trust level. The evaluation logic may also specify whether a trust level is to be computed in accordance with a "chain of trust", such that the trust level of a compute resource is dependent on not only its own trust level, but also the trust level of the underlying compute resources that the compute resource depends upon.

The trust manifest may also specify one or more actions that are to be performed. Some of these actions may be performed in response to a determined trust level and/or the selection of the trust manifest. For example, in response to the determined trust level falling below a threshold, selected users may be alerted via email, the compute resource may be shut down, and/or the compute resource may be placed in a development environment. For example, in response to the selection of the trust manifest, details of the trust computation may be logged in an external log datastore.

The trust level computation in a system which uses trust manifests is generic, in that the trust level can be computed for any resource type (e.g., container, virtual machine, hypervisor host, bare-metal host). The trust level computation is also generic in the sense that the trust level computation can be adapted to work with any integrity measurement method. The trust level computation in a system which uses trust manifests is also holistic (i.e., comprehensive), in that it may take into account a wide range of information ranging from integrity measurements, security assessments to a business owner in order to determine a trust level for a compute resource.

These and other embodiments of the invention are more fully described in association with the drawings below.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps. While the sequence diagrams each present a series of steps in a certain order, the order of some of the steps may be changed.

Figure 1A:
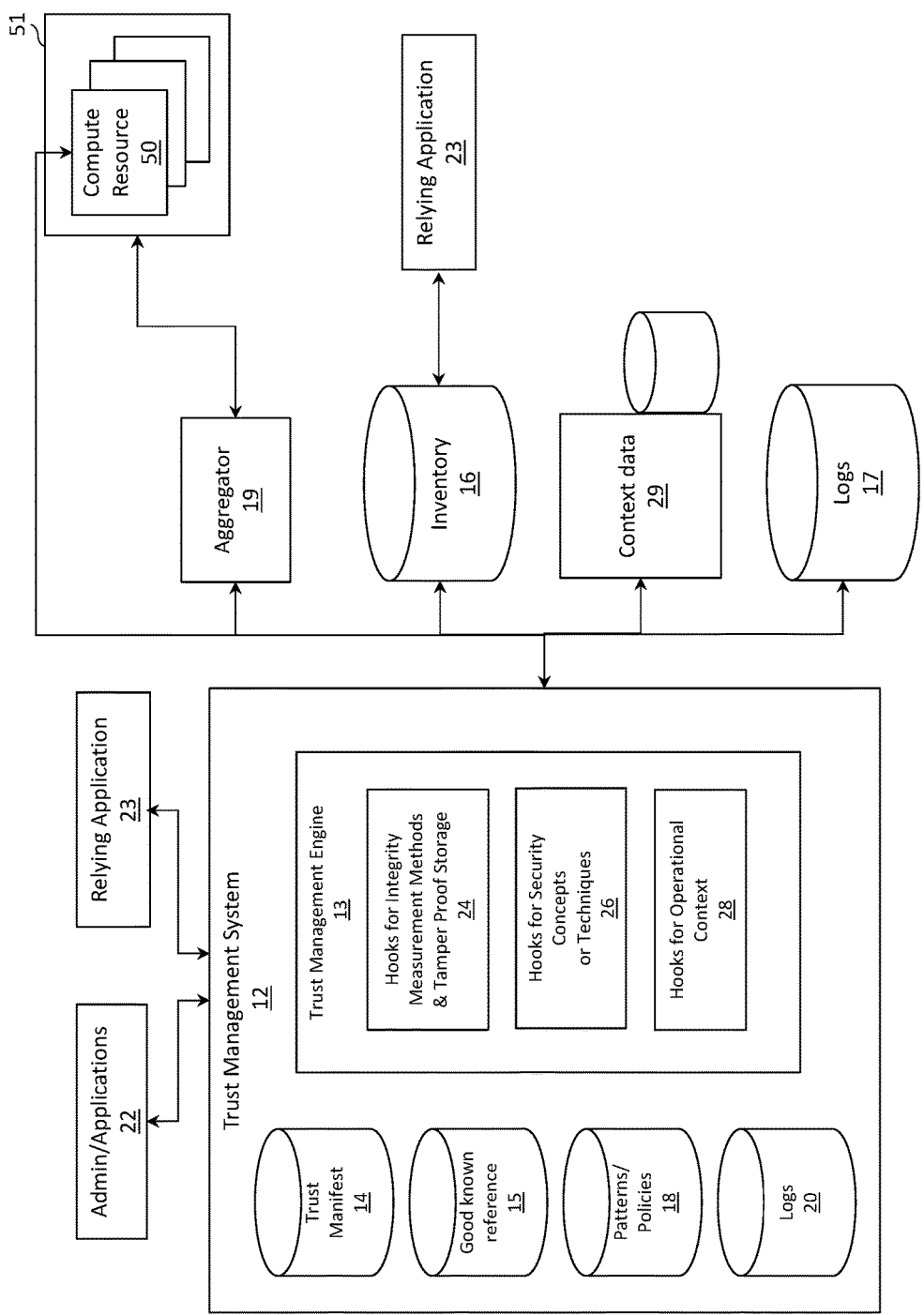
FIG. 1A depicts a trust management system and its associated components, in accordance with one embodiment of the invention.

FIG. 1A depicts trust management system 12 and its associated components, in accordance with one embodiment of the invention. Trust management system 12 may comprise trust management engine 13 that is configured to select (or create) a trust manifest for compute resource 50, and based on the selected or newly created trust manifest, compute a trust level for compute resource 50. A trust level may indicate a degree to which compute resource 50 should be trusted. While the trust level could be a binary value (e.g., 0 for not trustworthy and 1 for trustworthy), the trust level, in a preferred embodiment, may have a range of values. For example, the trust level could be 0, 1 or 2, in which 0 indicates that compute resource 50 is not trustworthy, 1 indicates that compute resource 50 is somewhat trustworthy, 2 indicates that compute resource 50 is trustworthy. As another example, the trust level could range from 0, 1, . . . , 9, 10, in which 0 indicates that compute resource 50 is not trustworthy, 10 indicates that compute resource 50 is trustworthy, and values in between indicating intermediate levels of trustworthiness. As another example, the trust level could include the rational numbers between 0 and 1, with 0 indicating that compute resource 50 is not trustworthy, 1 indicating that compute resource 50 is trustworthy, and values in between indicating intermediate levels of trust.

The meaning of trust may vary depending on the context and the inputs that are used to compute the trust level. In some contexts, trust may be associated with the authenticity of compute resource 50 (e.g., whether the compute resource is what it purports to be). In addition or in the alternative, trust may be associated with the security of compute resource 50 (e.g., how difficult it is for an unauthorized user to access and/or modify the data of compute resource 50). In addition or in the alternative, trust may be associated with the integrity of compute resource 50 (e.g., the likelihood that compute resource 50 has been tampered with).

Compute resource 50 may refer to any compute system, such as a bare-metal host, a hypervisor host, a virtual machine, a container, etc. At a minimum, a bare-metal host includes an operating system, firmware and any processor on which the operating system executes. Examples of a bare-metal host include a Dell Server running CentOS 7 operating system, etc. (the Dell Server provided by Dell of Round Rock, Tex.). A hypervisor host includes a type 1 or type 2 hypervisor running on top of firmware and a processor. As is known in the art, a hypervisor (also called a virtual machine monitor) is computer software, firmware or hardware that creates and runs one or more virtual machines. Examples of hypervisors include an ESXi™ (or an ESX host) from VMware, Inc.™ of Palo Alto, Calif.; a Xen Project™ from Citrix Systems™ of Fort Lauderdale, Fla.; a Hyper-V™ from Microsoft Corporation™ of Redmond, Wash.; and a kernel-based virtual machine (KVM). As is known in the art, a virtual machine is software that runs on top of a hypervisor and typically includes an operating system and applications. Virtual machines are typically not provided by a vendor, but rather are instantiated by enterprises using services/software provided by the vendor. As is known in the art, a container is an executable package of a piece of software that includes everything needed to run it, including code, runtime, system tools, system libraries and settings. Containers may be provided by Docker, Inc.™ of San Francisco, Calif.

Compute resource 50 may be instantiated within operational environment 51 (e.g., a data center). In one embodiment, trust management system 12 and its associated components may be instantiated outside of operational environment 51 (as shown), but they could also be instantiated partially or completely within operational environment 51 (not depicted).

A trust manifest may define how a trust level is to be computed, including a specification of one or more inputs for computing the trust level, how these inputs are to be measured and/or retrieved, and how these inputs are to be combined to arrive at the trust level. These inputs may include one or more integrity measurements and one or more security assessments. In one embodiment of the invention, integrity measurements can include a cryptographic hash generated using a configurable cryptographic message digest algorithm such as SHA-256. There could be other embodiments of an integrity measurement such as a globally uniqueID. The one or more integrity measurements may be performed using one or more third-party techniques, such as trusted execution technology (TXT) from Intel Corp.™ of Santa Clara, Calif., open cloud integrity technology (Open CIT) an open sourced attestation solution from Intel, unified extensible firmware interface (UEFI), or Notary from Docker, Inc. Further, integrity measurements may use tamper proof storage, such as that provided by a virtual trusted platform module (vTPM) or trusted platform module (TPM).

Additionally, each compute resource may have one integrity measurement that also aids with scalability, as the cryptographic hashes can be sorted and compared to good known cryptographic hashes easily. As new technologies come out, the metadata of the trust manifest can be extended with optional and/or mandatory attributes in order to leverage emerging techniques, for example, new cryptographic functions and methods.

Figure 1B:
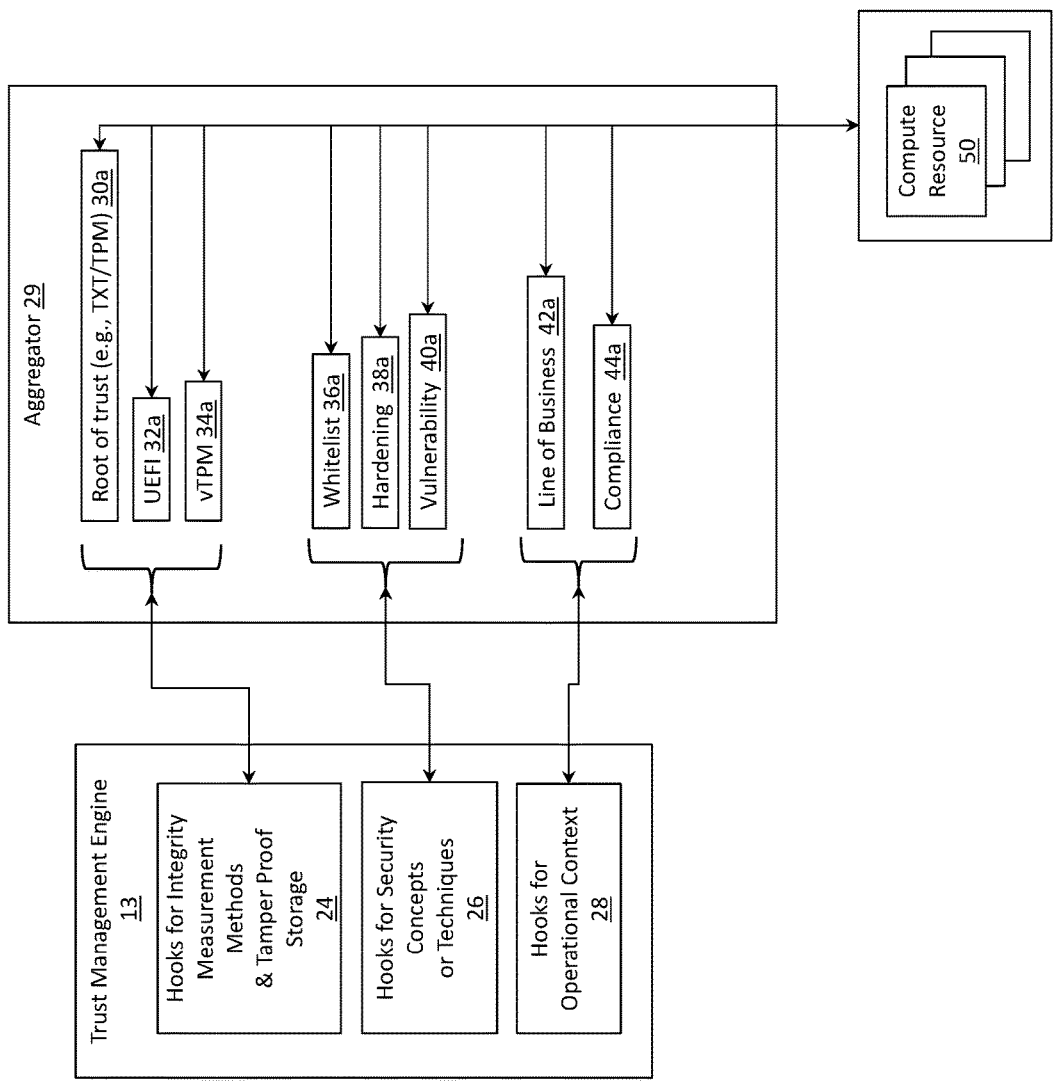
FIG. 1B depicts an aggregator which acts as an intermediary between hooks of a trust management engine and one or more compute resources, accordance with one embodiment of the invention.
Figure 1C:
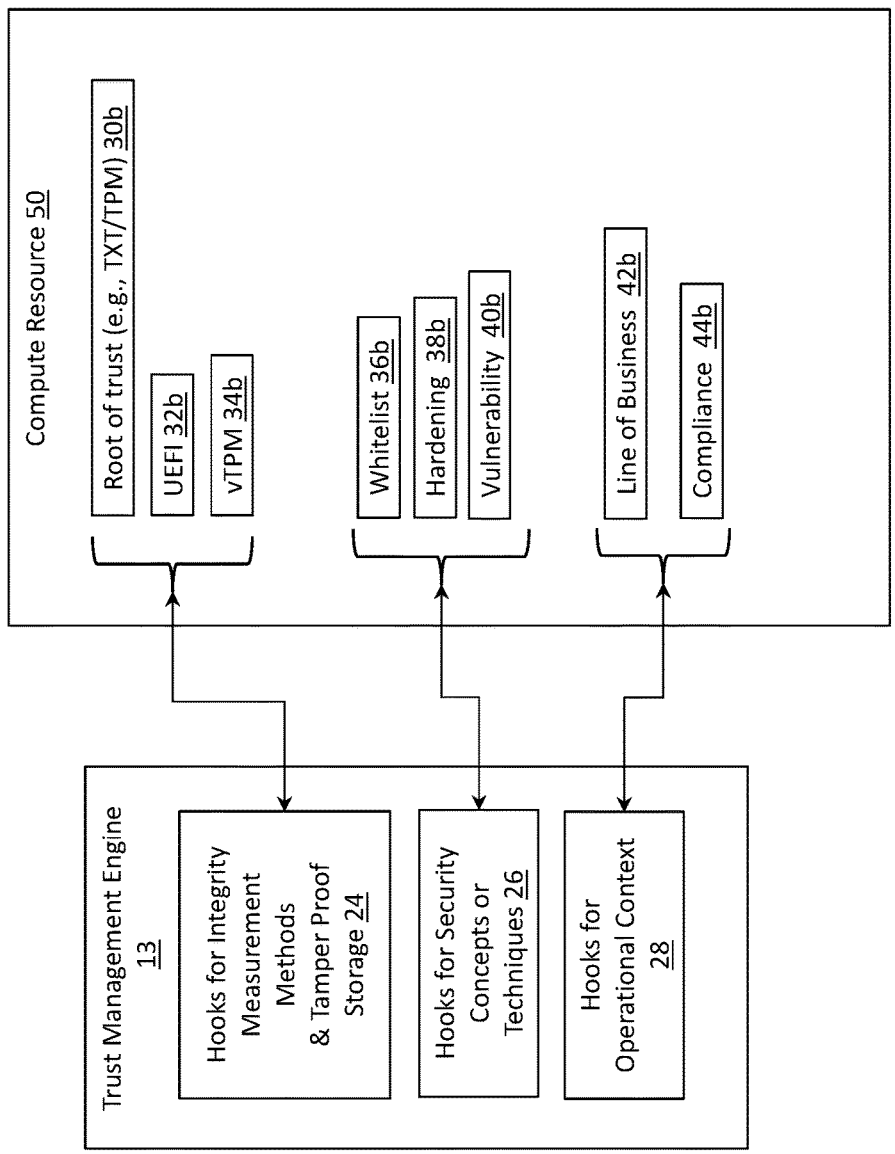
FIG. 1C depicts hooks of trust management engine directly coupled to a compute resource (without an aggregator), accordance with one embodiment of the invention.

Collection of hooks 24 may interface trust management engine 13 to a collection of integrity measurement methods (the integrity measurement methods possibly relying upon tamper proof storage). Hooks 24, which may be implemented as software plugins, adaptors and/or gateways, may call out to compute resource directly 50 or to an intermediary (i.e., aggregator 29) between trust management engine 13 and compute resource 50. More specifically, hooks 24 may call out to integrity measurement methods and tamper proof storage present in aggregator 29 (as depicted in FIG. 1B) or present in compute resource 50 (as depicted in FIG. 1C). The integrity measurement methods and tamper proof storage may include one or more of root of trust 30a, UEFI 32a and vTPM 34a (depicted in aggregator 29 of FIG. 1B), as well as other methods such as Docker Notary (not depicted). The integrity measurement methods and tamper proof storage may also include one or more of root of trust 30b, UEFI 32b and vTPM 34b (depicted in compute resource 50 of FIG. 1C), as well as other methods such as Docker Notary (not depicted). Aggregator 29 may represent a collection of management systems, such as a vCenter server, and may aggregate integrity measurements from multiple compute resource (e.g., one hundred VMs) to reduce the communication overhead for trust management engine 13.

One or more security assessment methods may be used to assess for vulnerabilities in the software installed on compute resource 50, whether software components of compute resource 50 are whitelisted, and whether the software installed on compute resource 50 is suitably hardened per given regulations. Vulnerability scans can be enabled to perform, at a basic level, version checks on the software installed on compute resource 50 for known security issues to full compliance checks. Trust management engine 13 can work with different vulnerability scanning techniques, such as Clair (an open source project for the static analysis of vulnerabilities in application containers currently including appc and docker), and Qualys container security from Qualys, Inc.™ of Redwood Shores, Calif. Vulnerability scanners are security assessment tools that scan the software installed on compute resources for known weaknesses, typically called common vulnerabilities and exposures (CVEs). Such vulnerability scanners may rely on sources such as the National Vulnerability Database (NVD) to obtain information about the CVEs associated with various commonly used software. Clair is one such open source CVE scanner that is configured to scan container images for vulnerabilities.

In a security assessment using a whitelist, trust management engine 13 may determine whether software components of compute resource 50 are approved and/or authorized to be used in an environment of an organization. In the whitelist, certain software components may be approved or (not approved) based on characteristics of the software components, such as the application type (e.g., Tomcat, ESXi), application version number (e.g., 7.1, 6.5), the name of the software component (e.g., a software component that has reached its end of life may be recorded in a blacklist), whether the software component has been patched, and whether the software component contains known security vulnerabilities (e.g., Apache Struts, etc.). The characteristics may be compared to reference characteristics of good known systems (e.g., a compute resource which runs in a clean room environment).

While it is expected that software components with a vulnerability would typically be blocked from executing, this is not always the case. Some software components may be allowed to run within a certain time window even though they have a vulnerability, because the patches may not yet be available (e.g., which may occur when an enterprise relies on open source components). In response to detecting a software component that runs with a vulnerability without a known patch, compensating controls for the vulnerability may be deployed (e.g., a specific network configuration may be deployed to block an exploit). As is known in the art, a compensating control, also called an alternative control, is a mechanism that is put in place to satisfy the requirement for a security measure that is deemed too difficult or impractical to implement at the present time. Further, software components with vulnerabilities may even be acceptable in certain environments as the vulnerability may not be exploitable.

Trust management engine 13 may work with different whitelisting mechanisms, for example the Definitive Media Library (DML) concept in the information technology library (ITIL) v3, or the BMC Atrium Product Catalog. Other examples of a whitelist could also include a homegrown spreadsheet of approved applications, a trusted container repository or a trusted registry.

Typically, an enterprise decides whether a software component of compute resource 50 is placed on a whitelist or not, while trust management engine 13 might make a recommendation as to whether a software component should be added or removed from the whitelist.

In a security assessment concerning the hardening of compute resource 50, compliance automation technology, such as HyTrust CloudControl (HTCC), may be used to determine whether the software installed on compute resource 50 is suitably hardened per regulations from the payment card industry or any other industry, in which hardening refers to the secure configuration settings of the specific application that is running. For example, there is a hardening guide (or best practices) from VMware for ESXi and NSX. The Center for Internet Security also develops hardening guides for these applications (i.e., for one application there may be many corresponding guides). These hardening guides only serve as guidance to the user, and are not mandatory. Organizations may develop their own variation that they can mandate for themselves.

Collection of hooks 26 may interface trust management engine 13 to a collection of security concepts or techniques. Hooks 26, which may be implemented as software plugins, adaptors and/or gateways, may call out to compute resource 50 directly or to aggregator 29 instantiated between trust management engine 13 and compute resource 50. More specifically, hooks 26 may call out to security applications present in aggregator 29 (as depicted in FIG. 1B) or present in compute resource 50 (as depicted in FIG. 1C). The security applications may include whitelist application 36a which determines whether or not a compute resource is approved to be used in an environment of an enterprise, hardening application 38a which provides an assessment as to whether a compute resource is suitably hardened per given regulations, vulnerability application 40a provides the results of a vulnerability scan (as depicted in aggregator 29 of FIG. 1B), as well as other security applications that are not depicted. Counterpart security applications may also be present in compute resource 50 (e.g., whitelist application 36b, hardening application 38b, vulnerability application 40a and other applications not depicted).

In addition to specifying the inputs for computing the trust level of compute resource 50, the trust manifest may also specify a procedure for processing the inputs to arrive at the trust level. More specifically, the procedure may also specify one or more rule statements and an evaluation logic for evaluating the one or more rule statements, the combination of which (rule statements and evaluation logic) may be used to process the inputs to arrive at the trust level. The evaluation logic may specify the rule statements to be evaluated in an OR, AND or ALL mode. More specifically, in the OR mode, the truth values of the evaluated rule statements would be combined using the Boolean OR operator; in the AND mode, the truth values of the evaluated rule statements would be combined using the Boolean AND operator; and in the ALL mode, the average number of the evaluated rule statements which evaluate to True is computed. For example, if two out of three rule statements evaluate to True, the trust level would be 0.66

At a conceptual level, all the rules are always processed, but depending on some setting (e.g., mode) the result of the processing may be looking for a first determinative outcome that would be indicating untrustworthy situations. For example, in the case of the AND mode, for increased computational efficiency, the rule statements could be arranged to have the most stringent rule first, and upon any of the rules evaluated to false, the trust level could be determined as 0 (or untrustworthy) without evaluating the remaining rule statements. Example rule statements are provided in Appendices A-D, and are described below in detail.

The trust manifest may also specify whether a trust level is to be computed in accordance with a "chain of trust", such that the trust level of compute resource 50 is dependent on not only its own trust level, but also the trust level of the underlying compute resources that compute resource 50 depends upon. For example, if compute resource 50 were a container, the trust level of the container might additionally depend on the trust level of the Docker image associated with the container, the trust level of the virtual machine within which the container is running, and the trust level of the hypervisor host on which the virtual machine is running. In one embodiment, the trust level in a chain of trust computation may be computed as the minimum of the respective trust levels of the compute resources in the compute stack (i.e., the compute stack including compute resource 50 and the underlying compute resources). In other words, the trust level in a chain of trust computation equals the trust level of the "weakest link" in the compute stack.

In some scenarios, the respective trust levels of the underlying compute resources may already have been computed and stored in inventory datastore 16 at an early point in time. In such scenarios, the trust levels of the underlying compute resources may simply be retrieved from inventory datastore 16. If, however, the trust levels of one or more of the underlying compute resources are not available from inventory datastore 16, the trust levels may be computed. For computational efficiency, the computation of the trust level of compute resource 50 may proceed in a top-down or a bottom-up evaluation order.

In a top-down evaluation order, the (isolated) trust level of compute resource 50 (i.e., isolated trust level referring to the trust level of compute 50 independent of the trustworthiness of the underlying components) may be computed first. If the isolated trust level is zero (or is equal to or below a threshold), the computation of the trust level for compute resource 50 terminates, and the trust level is returned as "0" or untrustworthy. Otherwise, if the isolated trust level is non-zero (or is above the threshold), the trust level of the next lower compute resource (i.e., directly underlying compute resource 50) is computed in accordance with the trust manifest of that underlying compute resource, and the process repeats successively for each compute resource in the next lower layer.

In a bottom-up evaluation order, the trust level of the bottom most compute resource may be computed first. If the trust level is zero (or is equal to or below a threshold), the computation of the trust level for compute resource 50 terminates, and the trust level is returned as "0" or untrustworthy. Otherwise, if the trust level is non-zero (or is above the threshold), the trust level of the next higher compute resource is computed in accordance with the trust manifest of that next higher compute resource, and the process repeats successively for each compute resource in the next higher layer until the isolated trust level of compute resource 50 is computed.

In another embodiment, the trust level in a "chain of trust computation" may be computed as the average of the trust levels of the compute resources in the compute stack (i.e., in which the trust level of the top most compute resource refers to the isolated trust level). In such an embodiment, there is no computational efficiency to be gained from a particular evaluation order of the rule statements.

Once the trust level of compute resource 50 has been computed, it may be stored in inventory datastore 16 along with an identifier of the compute resource. Further the selected manifest (or an identifier of the manifest) may also be stored with the trust level in inventory datastore 16, since the configuration of the selected manifest may influence the meaning of the trust level. For example, if the selected manifest had chain of trust enabled, then the trust level would correspond to the entire stack, whereas if the selected manifest did not have chain of trust enabled, then the trust level would correspond to a compute resource independently of its underlying compute resources (if any). Trust values that are stored in inventory datastore 16 may be accessible to a relying application 23 (i.e., an application that relies upon trust management system 12 for determining a trust level for a corresponding compute resource). If relying application 23 attempts to query inventory datastore 16, but the trust value for the requested compute resource is not available, relying application 23 may request trust management system 12 to compute the trust value for the requested compute resource (illustrated by relying application 23 being communicatively coupled to trust management system 12).

Trust manifest datastore 14 may store a plurality of trust manifests, and trust management engine 13 may select a trust manifest from trust manifest datastore 14 having attributes (or tags) which best match the characterizing attributes of compute resource 50. Example characterizing attributes of compute resource 50 may include a resource type (e.g., bare-metal host, hypervisor host, virtual machine, container, etc.). For each of the resource types, there may be additional characterizing attributes specific to that resource type. For instance, additional characterizing attributes for a container may include a container type (e.g., Docker container), a software application installed on the container (e.g., Apache Tomcat), and the version number of the software application (e.g., version 7.1). For a virtual machine, additional characterizing attributes may include a virtual machine type (e.g., VMware or Amazon Web Services (AWS)), a guest OS version (e.g., Windows 10), and where the virtual machine is running (e.g., on premises or in the cloud). For a hypervisor host, additional characterizing attributes may include a manufacturer (e.g., VMware, Citrix), a Bios version (e.g., 2.3), a VMM version (e.g., ESXi6.5), and vSphere Installation Bundle (VIB) identifiers (e.g., esx-ui, esx-xserver).

For example, if compute resource 50 were a Docker container instance running a Tomcat 7 image, a corresponding trust manifest using Docker Notary and other security assessment methods may be used to compute a trust level for compute resource 50. If compute resource 50 were a TXT/TPM enabled hardware from, for example Dell, then a corresponding trust manifest using Open CIT and other security assessment methods may be used to compute a trust level for compute resource 50.

The operational context of compute resource 50 may provide additional information (i.e., more static in nature) that is used by trust management engine 13 to select a manifest for compute resource 50. The operational context may include the contextual nature of the compute resource and where the compute resource is going to be executed, and more specifically may include the business owner (e.g., purpose) and business value (e.g., importance) of compute resource 50. Examples of a business owner may include departments of an organization (e.g., human resources, finance, etc.) which operate the compute resource. Further, a compute resource that is a "breadwinner" or that is used to provide a certain application may be assigned a higher business value than a compute resource that is used for other purposes. Suppose there are two matching trust manifests for a compute resource, one with more stringent computation of the trust level and one with a less stringent computation of the trust level. In response to a compute resource being identified to have a high business value, the trust manifest with the more stringent trust level computation may be assigned to the compute resource.

As another example, the operational context may also may quantify how compliant compute resource 50 needs to be with a regulation. In certain regulations, there may be a requirement for the environment to be properly configured, for the system to not run vulnerable software, to have two-factor authentication, to have adequate access control, to have physical surveillance, to be payment card industry data security standard (PCI-DSS) compliant, to be Sarbanes-Oxley Act (SOX) compliant, to be health insurance portability and accountability act (HIPAA) compliant, etc. In response to a compute resource being identified as needing to comply with an industry regulation, a trust manifest with a security assessment that checks for compliance with the industry regulation may be selected.

Collection of hooks 28 may interface trust management engine 13 to applications which provide the operational context of compute resource 50. Hooks 28, which may be implemented as software plugins, adaptors and/or gateways, may call out to compute resource 50 directly or to aggregator 29 instantiated between trust management engine 13 and compute resource 50. More specifically, hooks 28 may call out to operational context applications present in aggregator 29 (as depicted in FIG. 1B) or present in compute resource 50 (as depicted in FIG. 1C). The operational context applications may include one or more of an application to determine the line of business 42a and a compliance application 44a. Counterpart operational context applications may also be present in compute resource 50 (e.g., line of business application 42b, compliance application 44b, and other applications not depicted).

In accordance with one embodiment of the invention, a trust manifest may apply to a class of compute resources (rather than a specific compute resource). For example, one hundred Window Servers 2016 may all belong to one class of compute resources and a single trust manifest may be retrieved from trust manifest datastore 14 for all one hundred of the Window Servers 2016.

Logs datastore 20 may be used to store a full audit trail of all events associated with a trust manifest. For example, events resulting in a trust manifest being created, deprecated or destroyed may be logged and stored in logs datastore 20. If not already apparent, a deprecated manifest refers to an old manifest that trust management engine 13 predicts to be less secure than a new manifest (e.g., less secure due to staleness of trust manifest), but requires a user's confirmation prior to deleting the old manifest. As another example, as each compute resource in a stack of compute resources (e.g., including a hypervisor host, virtual machine, Docker container) is attested, an audit trail may be created to record what mechanism, proprietary, OEM or third-party software is being used to attest the trustworthiness of each of the compute resources.

Logs datastore 20 may also be used to store a full audit trail of all input used to generate a trust level, such that the reporting of a trust level may be accompanied by all the factors that went into generating that trust level. In this aspect, a credit score might be a useful analogy for understanding a trust level, in that in addition to a credit score, a credit report typically reports the various factors (e.g., number of open accounts, number of delinquent accounts, account balance, etc.) that were used to generate the credit score. In a similar fashion, integrity measurements, security assessments and other factors that were used to generate a trust level may be reported with the trust level.

All interaction from users or applications 22 with trust management system 12 are secured through a fine grained access control so that the integrity of trust management system 12 is not put into question and there is never any uncertainty regarding the trustworthiness of the computed trust level. Such fine grained access control is described in related U.S. Pat. No. 8,166,552, U.S. Pat. No. 8,539,589, U.S. Pat. No. 8,966,578, U.S. Pat. No. 9,450,940 and U.S. Pat. No. 9,734,349.

Inventory datastore 16 may store information about the hierarchy of compute resource 50. For example, in the case where compute resource 50 is a container, inventory datastore 16 may record that the container runs within a virtual machine, and the virtual machine runs on a host. The information from inventory datastore 16 may be utilized, for example, when a trust level is performed in accordance with a chain of trust.

Inventory datastore 16 may additionally store the trust level associated with each of the compute resources (i.e., an association between the trust level and an identifier of the compute resource). The storing of the trust level may occur successively over time (e.g., whenever it is computed), such that trust management engine 13 may determine a trend of the trust level (e.g., whether the trust level of a compute resource is increasing or decreasing over time). In one embodiment, upon the age of a trust level exceeding a time-to-live parameter, a trust level may be computed again (i.e., periodically refreshed) by trust management engine 13. For completeness, it is noted that inventory datastore 16 may be internal to trust management system 12 or may be external from trust management system 12 (as depicted).

Context data 29 could be a system providing real time data, and may not be persisted in a datastore. An example could be the nature of applications running on compute resource 50. For example, a configuration management database (CMDB) could provide context data such as "a MySQL DB is running on a VM" and "this VM belongs to a HR payroll service". Depending on the sensitivity/importance of the compute resource, additional checks/controls should be in place for the compute resource to remain trusted. Therefore, the context data may also include information regarding whether or not the data of the VM is being encrypted. Context data 29 may be internal to trust management system 12 or may be external from trust management system 12 (as depicted). Context data 29 may be used to select the best matching manifest for a compute resource.

Patterns/policies datastore 18 may store a record of how compute resources were assigned to trust manifests in the past. Such information may additionally influence which trust manifest is selected for a compute resource. For instance, if trust manifest A were selected for compute resource 1 in the past, and compute resource 2 were similar to compute resource 1, then based on this past association between manifest A and compute resource 1 from patterns/policies datastore 18, trust manifest A could be selected for compute resource 2.

Figure 2:
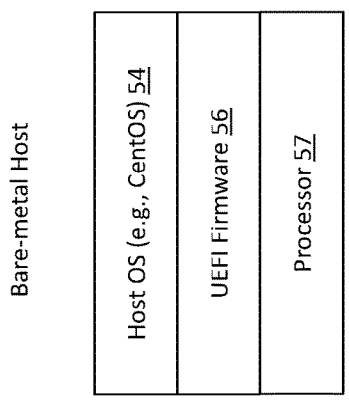
FIG. 2 depicts a bare-metal host for which the trust manifest of Appendix A specifies requirements for computing a trust level for a class of compute resources including this bare-metal host, in accordance with one embodiment of the invention.

The following figures, FIGS. 2-6, depict certain compute systems and compute stacks for which the trust manifests provided in the Appendices may be applied to compute trust levels. FIG. 2 depicts bare-metal host 52 (e.g., a bare-metal Dell host), which may include a host operating system 54 (e.g., CentOS) running on UEFI firmware 56 and a generic processor 57 (could be from Apple, AMD, Intel, etc.). Appendix A provides an example of a trust manifest for a class of bare-metal hosts, including bare-metal host 52. The first few fields of the trust manifest of Appendix A may include information to uniquely identify the trust manifest, for example a name (e.g., ManifestForBareMetalHost), a unique identifier (e.g., x7587901011111), and/or a description (e.g., Trust Manifest for a Bare-metal Dell Host). Following these fields, there may be a field (e.g., "isAuthorized") which labels whether the trust manifest has been authorized by user 22 or by trust management engine 13 to be used for computing a trust level. In the present example, the trust manifest is labeled as "isAuthorized=true", indicating that it may be used for computing a trust level for a corresponding compute resource. If, however, the trust manifest were not authorized, then a different trust manifest that is authorized would need to be selected or a new trust manifest would need to be created.

The next section of the trust manifest may specify the attributes which are used to determine the closeness of a match between a trust manifest and a compute resource. As such, these attributes may be characteristics associated with a compute resource. In the trust manifest of Appendix A, the attributes include a resource type (e.g., BareMetalHost), a manufacturer (e.g., Dell), and certain measurement attributes, for example a BIOS value (e.g., 2.3), a hostOS version (e.g., CentOS), and an OS version (e.g., 7.1).

The next section of the trust manifest may specify integrity measurement methods that may be used to compute integrity measurements, and one or more input/output parameters for the integrity measurement methods. The trust manifest of Appendix A specifies UEFI as the primary means for computing an integrity measurement (i.e., "isPrimary": true). With UEFI, during the booting of the bare-metal host, the signatures of the various binaries are verified. If the bare-metal host boots successfully, it is deemed to be secure. As such, the frequency of such an integrity measurement is labeled as "reboot" (since each reboot reveals the success or failure of the UEFI integrity measurement). The trust manifest also specifies a metric of the "rebootTime" associated with the UEFI integrity measurement, indicating that the time of reboot is to be recorded along with whether a reboot was successful or not successful.

The trust manifest of Appendix A also specifies the backup means of OpenCIT for computing an integrity measurement (i.e., "isPrimary": false). In other words, an OpenCIT integrity measurement may be used if an UEFI integrity measurement cannot be computed. Further, the OpenCIT integrity measurement is to be performed daily (i.e., "frequency": "daily"); the cryptography algorithm of SHA-256 is to be used to compute the integrity measurement; and the metric of "freshness" is to be returned with the integrity measurement (indicating the age of the OpenCIT integrity measurement).

The next section of the trust manifest may specify security assessments that may be performed. In the trust manifest of Appendix A, a whitelist is to be used to determine if the bare-metal host is on a list of allowed bare-metal hosts. In the current example, HTCC is to be used to determine whether bare-metal host 52 is on a whitelist.

The next section of the trust manifest may specify how a trust level is to be computed based on one of more of the integrity measurements and the security assessments. In this section, one or more rule statements may be provided, in which a rule statement may include a statement that evaluates to true or false. The rule statement "ensure the system securely booted" evaluates to true if the system was booted with UEFI turned on and the system booted successfully, and evaluates to false otherwise. The rule statement "ensure the system was rebooted within 14 days" evaluates to true if the system was rebooted within 14 days, and evaluates to false otherwise. The rule statement "ensure the system is whitelisted" evaluates to true if the system is in the whitelist, and evaluates to false otherwise. Upon each of the rules being evaluated, the trust level may be computed in accordance with one of the AND, OR and ALL modes described above. In the instant trust manifest, the rule statements are to be evaluated in accordance with the ALL mode (i.e., "ruleProcessingMode": "all"). Chain of trust is not enabled in the instant manifest (i.e., "chainOfTrust": "none").

The trust level computation may also specify one or more action statements that are to be performed once the trust level is computed, and such action statements may alter the behavior of trust management system 12 and/or bare-metal host 52. For example, the action statement ("actionStatement": "update inventory database with new trust level") instructs trust management engine 13 to update inventory datastore 16 with the newly computed trust level. As another example, the action statement ("actionStatement": "additionally log details of trust level computation in an external repository") instructs trust management engine 13 to additionally record all details of the trust level computation in log datastore 17 in addition to log datastore 20 (e.g., including the integrity measurements, security assessments, the evaluation of rule statements, etc.). Due to the sensitivity of data associated with the compute resource, the additional logging might be performed for data redundancy or to permit an external audit function. Such action statement alters a behavior of trust management system 12.

As another example, the action statement ("actionStatement": "Alert <user1, user2> if trust level <50%") instructs trust management engine 13 to generate an alert and notify selected users (e.g., user1, user2) through e-mail or other communication mechanisms if the trust level is below a certain threshold, and similarly alters a behavior of trust management system 12. The notification may include information concerning which compute resource was determined to be untrustworthy (or more generally which compute resource had a trust level below a threshold), why it was determined to be untrustworthy (e.g., which rule statement(s) evaluated to false), the trust level of the compute resource, and potentially actions to mitigate the reasons for the low trust level. This notification may be in lieu of or in addition to any default notification to a default group of users provided at a system wide level. It is noted that the trust level threshold for triggering an alert in the default notification may be the same or different from the trust level threshold in the action statement.

Figure 3:
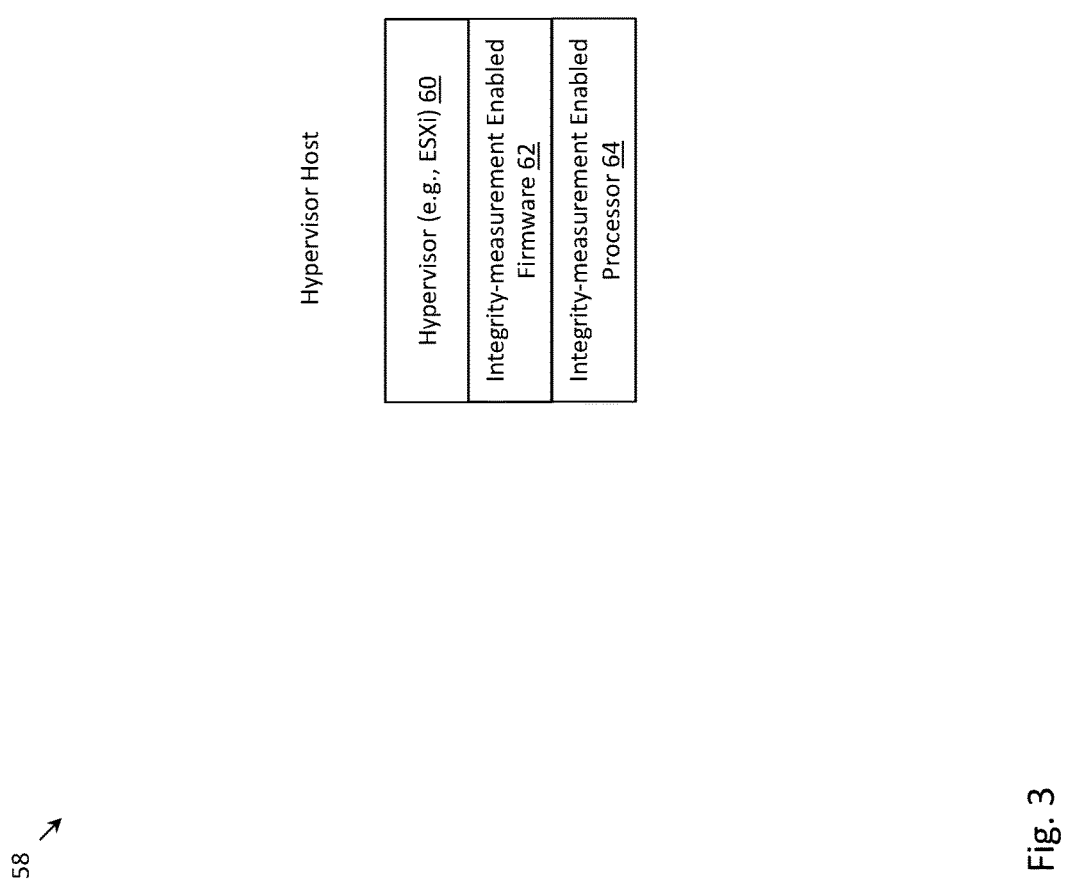
FIG. 3 depicts a hypervisor host for which the trust manifest of Appendix B specifies requirements for computing a trust level for a class of compute resources including this hypervisor host, in accordance with one embodiment of the invention.

FIG. 3 depicts hypervisor host 58 comprising hypervisor 60 (e.g., ESXi) running on integrity measurement enabled firmware 62 (e.g., firmware operating with TXT/TPM), and integrity measurement enabled processor 64 (e.g., processor operating with TXT/TPM). Appendix B provides an example of a trust manifest for a class of hypervisor hosts, including hypervisor host 58. The first few fields of the trust manifest of Appendix B may include information to uniquely identify the trust manifest, for example a name (e.g., ManifestForDellHypervisorHost), a unique identifier (e.g., x8589901911xf), and/or a description (e.g., Trust Manifest for a Dell Host running ESXi Hypervisor). Following these fields, there may be a field (e.g., "isAuthorized") which indicates whether the trust manifest has been authorized by user 22 or by trust management system 12 to be used for computing a trust level. In the present example, the trust manifest is labeled as "isAuthorized=true", which means that it may be used for computing a trust level for a corresponding compute resource.

The next section of the trust manifest may specify the attributes which are used to determine the closeness of a match between a trust manifest and a compute resource. In the trust manifest of Appendix B, the attributes include a resource type (e.g., HypervisorHost), a manufacturer (e.g., Dell), and certain measurement attributes, for example a BIOS version (e.g., 2.3), a hypervisor type (e.g., VMware ESXi), VMM version (e.g., 7.1) and vSphere installation bundle (VIB) components (e.g., esx-ui, esx-xserver).

The next section of the trust manifest may specify integrity measurement mechanisms that may be used to compute integrity measurements, and one or more input/output parameters for the integrity measurement mechanisms. The trust manifest of Appendix B specifies Open CIT as the primary means for computing an integrity measurement (i.e., "isPrimary": true). With Open CIT, during booting of the system, the BIOS and the hypervisor are measured and stored in the trusted platform module (TPM) as a digest. This digest may be compared by trust management engine 13 with good known reference values digests stored in good known reference datastore 15 to establish the root of trust. As such, the frequency of such an integrity measurement is labeled as "reboot" (since each reboot reveals the success or failure of the Open CIT integrity measurement). Further, the cryptography message digest algorithm of SHA-256 must be used to compute the integrity measurement, and the metric of "freshness" must be returned with the integrity measurement (indicating an age of the OpenCIT integrity measurement).

The trust manifest of Appendix B also specifies the backup means of UEFI for computing an integrity measurement (i.e., "isPrimary": false). The UEFI integrity measurement must be performed once per day (i.e., "frequency": "daily") and the metric of "freshness" must be returned with the integrity measurement (indicating an age of the UEFI integrity measurement).

The next section of the trust manifest may specify security assessments that may be performed. In the trust manifest of Appendix B, a whitelist is to be used to determine if the hypervisor host is on a list of allowed hypervisor hosts. In the current example, HyTrust CloudControl (HTCC) is to be used to determine whether hypervisor host 58 is whitelisted.

The next section of the trust manifest may specify how a trust level is to be computed based on one of more of the integrity measurements and the security assessments. In this section, one or more rule statements may be provided, in which a rule statement may include a statement that evaluates to true or false. The rule statement "ensure the integrity measurement matches the good known value" evaluates to true if the integrity measurement matches the good known value stored in good known reference datastore 15, and evaluates to false otherwise. The good known value may correspond to the integrity measurement that was measured for a substantially identical compute resource (i.e., a compute resource with attributes that match those of hypervisor host 58) that operates in clean room or a substantially identical compute resource that is otherwise known to be trustworthy. The rule statement "ensure the freshness of the integrity measurement by checking if the system was rebooted within 7 days" evaluates to true if the hypervisor host was rebooted in the last 7 days, and evaluates to false otherwise. The rule statement "ensure the system is whitelisted" evaluates to true if the hypervisor host is whitelisted, and evaluates to false otherwise. Upon each of the rules being evaluated, the trust level may be computed in accordance with one of the AND, OR and ALL modes described above. In the instant trust manifest, the rule statements are to be evaluated in accordance with the ALL mode (i.e., "ruleProcessingMode": "all"). Chain of trust is not enabled in the instant manifest (i.e., "chainOfTrust": "none").

The trust level computation may also specify one or more action statements that are to be performed once the trust level is computed. For example, the action statement ("actionStatement": "update inventory database with new trust level") instructs trust management engine 13 to update inventory datastore 16 with the newly computed trust level. As another example, the action statement ("actionStatement": "additionally log details of trust level computation in an external repository") instructs trust management engine 13 to additionally record all details of the trust level computation in log datastore 17 in addition to log datastore 20. As another example, the action statement ("actionStatement": "Alert <user1, user2> if trust level <50%") instructs trust management engine 13 to generate an alert and notify selected users (e.g., user1, user2) through e-mail or other communication means if the trust level is less than 50%.

Figure 4:
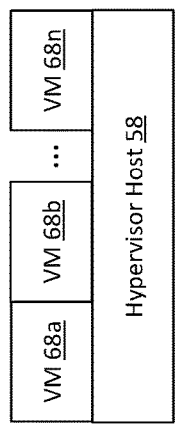
FIG. 4 depicts a virtual machine (running on the hypervisor host of FIG. 3) for which the trust manifest of Appendix C specifies requirements for computing a trust level for a class of compute resources including this hypervisor host, in accordance with one embodiment of the invention.

FIG. 4 depicts compute stack 66 with one or more virtual machine 68*a*, 68*b*, 68*n* running on hypervisor host 58. Appendix C provides an example of a trust manifest for a class of virtual machines, including virtual machine 68*a*. The first few fields of the trust manifest of Appendix C may include information to uniquely identify the trust manifest, for example a name (e.g., ManifestForvSphereVM), a unique identifier (e.g., x9589941911xt), and/or a description (e.g., Trust Manifest for a Linux VM running on a ESXi Hypervisor Host). Following these fields, there may be a field (e.g., "isAuthorized") which indicates whether the trust manifest has been authorized by user 22 or by trust management engine 13 to be used for computing a trust level. In the present example, the trust manifest is labeled as "isAuthorized=true", which means that it may be used for computing a trust level for a corresponding resource.

The next section of the trust manifest may specify the attributes which are used to determine the closeness of match between a trust manifest and a compute resource. In the trust manifest of Appendix C, the attributes include a resource type (e.g., VM), virtual machine type (e.g., vSphere), and certain measurement attributes, for example an operating system name (e.g., CentOS) and an operating system version (e.g., 7.0).

The next section of the trust manifest may specify integrity measurement methods that may be used to compute integrity measurements, and one or more input/output parameters for the integrity measurement methods. The trust manifest of Appendix C specifies Open CIT as the primary means for computing an integrity measurement (i.e., "isPrimary": true). With Open CIT, during booting of the system, the software configuration of the virtual machine is measured and compared, by trust management engine 13, with known good reference values stored in the good known reference database 15 to establish the root of trust. The frequency of such an integrity measurement may be labeled as "start, reboot", indicating that the Open CIT measurement should be performed at the startup and reboot of a virtual machine. Further, the cryptography algorithm of SHA-256 is to be used to compute the integrity measurement, and the metric of "freshness" is to be returned with the integrity measurement (indicating an age of the OpenCIT integrity measurement).

The next section of the trust manifest may specify security assessments that may be performed. In the trust manifest of Appendix C, the Qualys vulnerability assessment is to return a count of the number of high severity CVEs. The trust manifest of Appendix C also specifies that a whitelist is to be used to determine whether the virtual machine is on a list of allowed virtual machines. In the current example, HyTrust CloudControl (HTCC) is to be used to determine whether virtual machine 68a is on a whitelist.

The next section of the trust manifest may specify how a trust level is to be computed based on one of more of the integrity measurements and the security assessments. In this section, one or more rule statements may be provided, in which a rule statement may include a statement that evaluates to true or false. The rule statement "ensure the integrity measurement for the VM image matches the good known value" evaluates to true if the integrity measurement for the VM image matches the good known value in good known reference datastore 15, and evaluates to false otherwise. The good known value may correspond to the integrity measurement that was measured from a substantially identical compute resource (i.e., a compute resource with attributes that match those of virtual machine 68a) that operates in clean room or a substantially identical compute resource that is otherwise known to be trustworthy. The rule statement "ensure the freshness of the integrity measurement by checking if the system was rebooted within 7 days" evaluates to true if the virtual machine was rebooted in the last 7 days, and evaluates to false otherwise. The rule statement "ensure the system is whitelisted" evaluates to true if the virtual machine is in the whitelist, and evaluates to false otherwise. The rule statement "Verify the results of the vulnerability scan to ensure there are no more than 3 high severity CVEs" evaluates to true if there are three of fewer CVEs, and evaluates to false otherwise. Upon each of the rules being evaluated, the trust level may be computed in accordance with one of the AND, OR and ALL modes described above. In the instant trust manifest, the rule statements are to be evaluated in accordance with the ALL mode (i.e., "ruleProcessingMode": "all").

In the current example, chain of trust is enabled with the bottom up evaluation order (i.e., "chainOfTrust": "bottomUp") instructing trust management engine 13 to first compute (or retrieve from inventory datastore 16) the trust level of hypervisor host 58 in accordance with the trust manifest from Appendix B. If the trust level of hypervisor host 58 is zero, then the trust level of virtual machine 68a may be determined as zero (or untrusted). If the trust level of hypervisor host 58 is non-zero, then the isolated trust level of virtual machine 68a may be computed. The trust level of virtual machine 68a may then be computed as the minimum of the isolated trust level of virtual machine 68a and the trust level of hypervisor host 58.

The trust level computation may also specify one or more action statements that are to be performed once the trust level is computed, and such action statements may alter the behavior of trust management system 12 and/or virtual machine 68a. For example, the action statement ("actionStatement": "update inventory database with new trust level") instructs trust management engine 13 to update inventory datastore 16 with the newly computed trust level. As another example, the action statement ("actionStatement": "additionally log details of trust level computation in an external repository") instructs trust management engine 13 to additionally record all details of the trust level computation in log datastore 17 in addition to log datastore 20. As another example, the action statement ("actionStatement": "Alert <user1, user2> if trust level <50%") instructs trust management engine 13 to generate an alert and notify selected users (e.g., user1, user2) through e-mail or other communication means if the trust level is less than 50%. As another example, the action statement ("actionStatement": "if trustLevel is 0% then Shutdown VM") instructs trust management engine 13 to shutdown virtual machine 68a if the trust level is determined to be zero, and as such, alters a behavior of virtual machine 68a.

Figure 5:
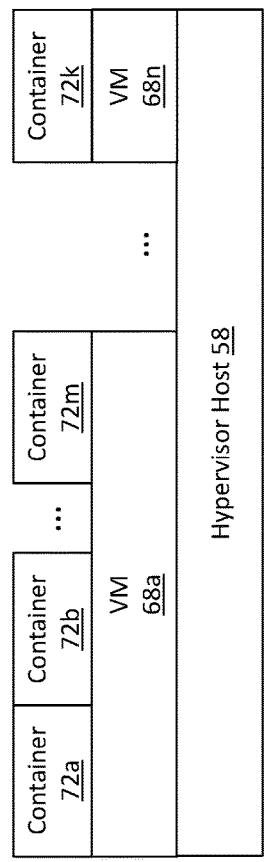
FIG. 5 depicts a container (running on the virtual machine of FIG. 4) for which the trust manifest of Appendix D specifies requirements for computing a trust level for a class of compute resources including this container, in accordance with one embodiment of the invention.

FIG. 5 depicts compute stack 70 with one or more containers running inside one or more virtual machines. As depicted in FIG. 5, there may be a one-to-one correspondence between virtual machines and containers (e.g., container 72k and virtual machine 68n) or a one-to-many relationship between virtual machines and containers (e.g., containers 72a, . . . , 72m running inside virtual machine 68a). Appendix D provides an example of a trust manifest for a class of containers, including container 72a. The first few fields of the trust manifest of Appendix D may include information to uniquely identify the trust manifest, for example a name (e.g., ManifestForDockerContainer), a unique identifier (e.g., x9589941511vt), and/or a description (e.g., Trust Manifest for a Docker container running Tomcat software). Following these fields, there may be a field (e.g., "isAuthorized") which indicates whether the trust manifest has been authorized by user 22 or by trust management system 12 to be used for computing a trust level. In the present example, the trust manifest is labeled as "isAuthorized=true", which means that it may be used for computing a trust level for a corresponding compute resource.

The next section of the trust manifest may specify the attributes which are used to determine the closeness of a match between a trust manifest and a compute resource. In the trust manifest of Appendix D, the attributes include a resource type (e.g., container), a container type (e.g., Docker), and certain measurement attributes, for example a repository name (e.g., Tomcat) and a tag value (e.g., 7.0).

The next section of the trust manifest may specify integrity measurement methods that may be used to compute integrity measurements, and one or more input/output parameters for the integrity measurement methods. The trust manifest of Appendix D specifies Docker Notary for computing an integrity measurement, and specifies that Docker Notary is to check if the image used to instantiate the container is signed (i.e., "name": "isSigned"). The frequency of such an integrity measurement may be labeled as "start, daily", indicating that this check by Docker Notary should be performed at the startup of a container and at least one a day.

The next section of the trust manifest may specify security assessments that may be performed. In the trust manifest of Appendix D, a vulnerability scan is to be performed using the Clair software, and Clair is to return a count of the number of high severity CVEs. In the trust manifest of Appendix D, a whitelist is also used to determine whether container 72a is on a list of allowed containers. In the current example, HyTrust CloudControl (HTCC) is to be used to determine whether container 72a is on a whitelist.

The next section of the trust manifest may specify how a trust level is to be computed based on one of more of the integrity measurements and the security assessments. In this section, one or more rule statements may be provided, in which a rule statement may include a statement that evaluates to true or false. The rule statement "ensure the Docker image is signed" evaluates to true if Docker Notary indicates that the image used to instantiate the container is signed, and evaluates to false otherwise. The rule statement "ensure the system is whitelisted" evaluates to true if HTCC indicates that the container is on a list of allowed systems, and evaluates to false otherwise. The rule statement "Verify the results of the vulnerability scan to ensure there are no more than 3 high severity CVEs" evaluates to true if the Clair software indicates that there are three of fewer CVEs, and evaluates to false otherwise. Upon each of the rules being evaluated, the trust level may be computed in accordance with one of the AND, OR and ALL modes described above. In the instant trust manifest, the rule statements are to be evaluated in accordance with the ALL mode (i.e., "ruleProcessingMode": "all").

In the current example, chain of trust is enabled with the bottom up evaluation mode (i.e., "chainOfTrust": "bottomUp"), instructing trust management engine 13 to compute the trust level of the underlying hypervisor host 58, followed by the trust level of virtual machine 68a, then followed by computing the trust level for container 72a. More specifically, the trust level of hypervisor host 58 is first computed in accordance with the trust manifest of Appendix B (or retrieved from inventory datastore 16). If the trust level of hypervisor host 58 is zero, the trust level computation may stop and the trust level of zero or untrusted may be returned. Otherwise, if the trust level of hypervisor host 58 is non-zero, the trust level of virtual machine 68a may be computed in accordance with the trust manifest from Appendix C (or retrieved from inventory datastore 16). If the trust level of virtual machine 68a is zero, the trust level computation may stop and the trust level of zero or untrusted may be returned. Otherwise, if the trust level of virtual machine 68a is non-zero, the isolated trust level of container 72a may be computed. The trust level of container 72a may then be computed as the minimum of the trust level of all the components in compute stack 70 (i.e., minimum of isolated trust level of container 72a, trust level of virtual machine 68a and trust level of hypervisor host 58).

The trust level computation may also specify one or more action statements that are to be performed once the trust level is computed, such action statements altering a behavior of trust management system 12 and/or container 72a. For example, the action statement ("actionStatement": "update inventory database with new trust level") instructs trust management engine 13 to update inventory datastore 16 with the newly computed trust level. As another example, the action statement ("actionStatement": "additionally log details of trust level computation in an external repository") instructs trust management engine 13 to additionally record all details of the trust level computation in log datastore 17 in addition to log datastore 20. As another example, the action statement ("actionStatement": "Alert <user1, user2> if trust level <80%") instructs trust management engine 13 to generate an alert and notify selected users (e.g., user1, user2) through e-mail or other communication means if the trust level is less than 80%. As another example, the action statement ("actionStatement": "if trustLevel <50% stop container") instructs the container 72a to shut down if the trust level is less than 50%, affecting a behavior of container 72a.

Figure 6:
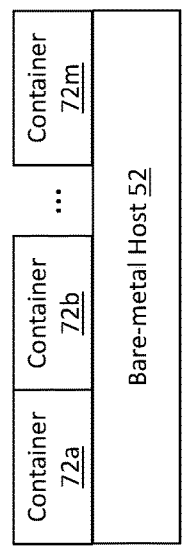
FIG. 6 depicts a container (running on the bare-metal host of FIG. 2) for which the trust manifest of Appendix D specifies requirements for computing a trust level for a class of compute resources including this container, in accordance with one embodiment of the invention.

FIG. 6 depicts compute stack 76 with containers 72a, . . . 72m running on bare-metal host 52. Appendix D (described above) provides an example of a trust manifest for a class of compute resources, including container 72a. The trust level computation for a container running on a virtual machine (FIG. 5) may be similar to the trust level computation for a container running on a bare-metal host (FIG. 6), except for the chain of trust computation. Trust management engine 13 may first compute (or retrieve from inventory datastore 16) the trust level of bare-metal host 52 in accordance with the trust manifest from Appendix A. If the trust level of bare-metal host 52 is zero, then the trust level of container 72a may be determined as zero (or untrusted). If the trust level of bare-metal host 52 is non-zero, then the isolated trust level of container 72a may be computed. The trust level of container 72a may then be computed as the minimum of the isolated trust level of container 72a and the trust level of bare-metal host 52.

Figure 7:
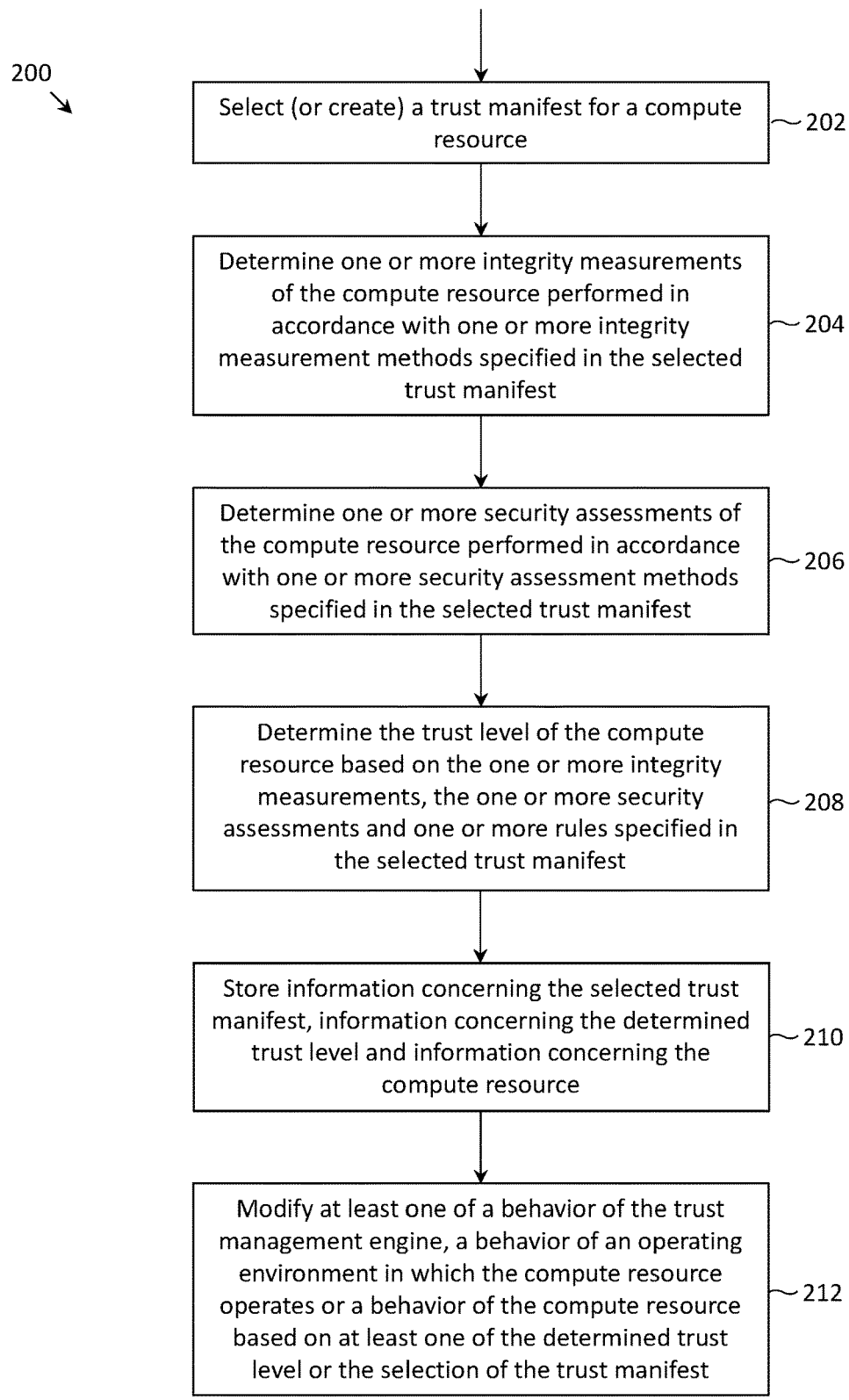
FIG. 7 depicts a flowchart of a process to determine the trust level of a compute resource, in accordance with one embodiment of the invention.

FIG. 7 depicts flowchart 200 of a process to determine the trust level of a compute resource. At step 202, a trust manifest that is most applicable for the compute resource may be selected or if none exists, a new trust manifest may be created. The trust manifest may be selected from a plurality of candidate trust manifests, and the selected trust manifest may be the one that best matches the compute resource in terms of how closely the attributes of the trust manifest match the characterizing attributes of the compute resource. Attributes of a compute resource may include the type of compute resource, such as a bare-metal host, a hypervisor host, a virtual machine or a container, and each type of compute resource may have further characterizing attributes specific to the resource type. The trust manifest may also be selected based on the operational context. For example, a compute resource that has been identified as a breadwinner may result in a manifest with more stringent rule evaluation logic (e.g., AND mode) to be selected over a manifest with less stringent rule evaluation logic (e.g., ALL mode). As another example, a compute resource that has been identified as needing to comply with an industry standard may result in a manifest that includes a security assessment that checks for compliance with the industry standard. Further details regarding step 202 are provided in FIG. 9 below.

Assuming that a trust manifest is selected (or a new one is created), the process proceeds to step 204, in which trust management engine 13 may determine one or more integrity measurements of the compute resource. These integrity measurements may be determined in accordance with one or more integrity measurement methods specified in the selected trust manifest. As described above, the integrity measurements may be performed at aggregator 29 and/or compute resource 50. Integrity measurement methods may include trusted execution technology (TXT), open cloud integrity technology (Open CIT), unified extensible firmware interface (UEFI), virtual trusted platform module (vTPM) and Docker Notary.

At step 206, trust management engine 13 may determine one or more security assessments of the compute resource. These security assessments may be determined in accordance with one or more security assessment methods specified in the selected trust manifest. As described above, security assessments may be performed at aggregator 29 and/or compute resource 50. The one or more security assessment methods comprise at least one of a vulnerability assessment method, a whitelist assessment method, or a method for assessing whether the compute resource is hardened. Vulnerability assessment methods may include Clair, Qualys and/or other vulnerability assessment methods. A whitelist assessment method may be performed using HTCC. Further, an assessment method may assess whether a compute resource is sufficiently hardened to comply with PCI regulations.

At step 208, trust management engine 13 may determine a trust level of the compute resource based on the one or more integrity measurements, the one or more security assessments, and one or more rule statements specified in the selected trust manifest. Each rule statement may include a statement which compares the one or more integrity measurements and/or the one or more security assessments to good known values or other thresholds, and evaluates to true or false. Evaluation logic may determine how the rule statements are to be combined (e.g., OR, AND, ALL modes described above) to arrive at the trust level of the compute resource. Many example rule statements are found in the Appendices. More specifically, trust management engine 13 may execute the one or more rule statements specified in the selected trust manifest and through said execution of said rule statements, determine the trust level of the compute resource based on (i) one or more integrity measurements of the compute resource, said integrity measurements determined in accordance with one or more integrity measurement methods specified in the selected trust manifest, and (ii) one or more security assessments of the compute resource, said security assessments being determined in accordance with one or more security assessment methods specified in the selected trust manifest.

At step 210, information concerning the selected trust manifest (e.g., an identifier of the selected trust manifest), information concerning the determined trust level (e.g., the determined trust level, details of the trust level computation), and information concerning an identifier of compute resource 50 (e.g., the resource name, universal identifier, resource description) may be stored in inventory datastore 16. Such storing permits the trust level to be retrieved for a specific compute resource at a later point by relying application 23. As discussed above, the meaning of a trust level may be influenced by the trust manifest (e.g., depending on whether chain of trust is selected), so the trust manifest (or an identifier of same) used to compute the trust level may be stored with the trust level in inventory datastore 16.

At step 212, an action may be performed that modifies at least one of a behavior of trust management engine 13, a behavior of operational environment 51 in which compute resource 50 operates, or a behavior of compute resource 50, and the action may be based on at least one of the determined trust level or the trust manifest that was selected. For example, the selection of a trust manifest may increase the rating associated with a trust manifest, making the trust manifest more likely to be selected in the future (which modifies a behavior of trust management engine 13). More specifically, the rating of a trust manifest may be associated with the frequency with which a trust manifest has been selected, a count of the number of times that the trust manifest has been selected, and/or how recently the trust manifest has been selected. As another example, the selection of the trust manifest may result in the details of the trust computation to be logged to external log datastore 17 (which modifies a behavior of trust management engine 13).

As another example, the determined trust level falling below a threshold may cause a behavior of operational environment 51 to be modified. For example, compensating controls could be deployed in operational environment 51, including one or more of deploying firewalls to prevent access to compromised or compromisable ports, deploying anti-virus software, deploying an intrusion detection/prevention system, performing data backups more frequently than might otherwise be the case, increasing logging activities to retain records of all transactions in a network, isolating servers running affected systems so they cannot propagate potential malware across devices, and encrypting data stored by the compute resource.

As another example, the determined trust level falling below a threshold may result in the shutdown of a virtual machine or a container (which modifies a behavior of compute resource 50). As another example, the determined trust level falling below a threshold may result in an alert being communicated to a selected group of users (which modifies a behavior of trust management engine 13). As another example, the determined trust level falling below a threshold may result in a compute resource being placed in a development environment, and otherwise, it may be placed (or remain) in a production environment.

Figure 8:
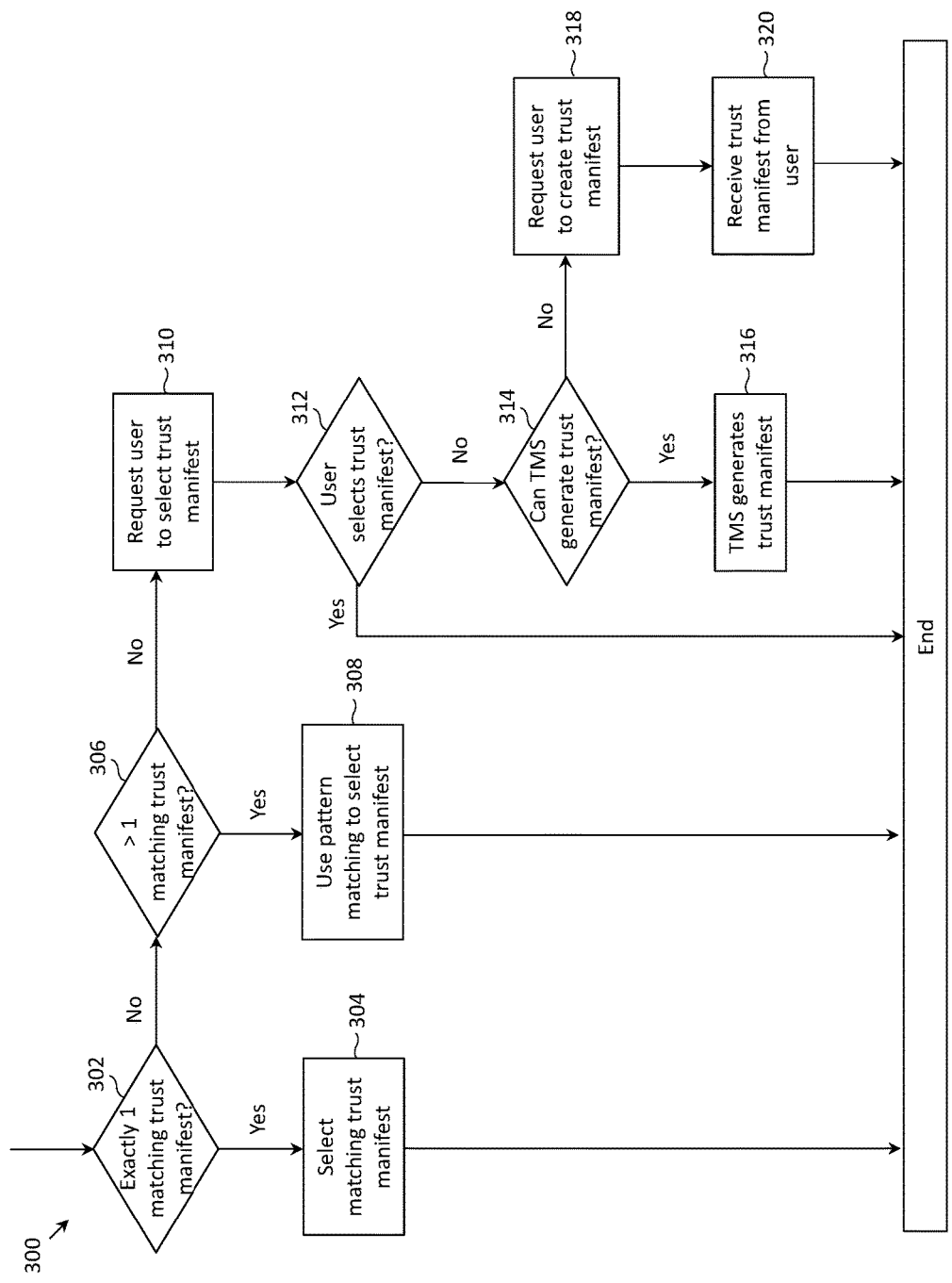
FIG. 8 depicts flowchart of a process for selecting or creating a trust manifest for a compute resource, in accordance with one embodiment of the invention.

FIG. 8 depicts flowchart 300 of a process for selecting or creating a trust manifest for a compute resource, in accordance with one embodiment of the invention. At step 302, trust management engine 13 may determine whether exactly one trust manifest matches the compute resource. If so, the matching trust manifest is selected (step 304). Otherwise, the process continues to step 306, in which trust management engine 13 may determine whether there is greater than one matching trust manifest. If so, pattern matching may be employed to narrow the applicable trust manifests down to one trust manifest (step 308). For example, past assignments between compute resources and trust manifests (stored in patterns/policies datastore 18) may be relied upon to select a trust manifest from several possible candidates. Otherwise, the user may be requested to select a trust manifold that best matches the compute resource (step 310). If the user is able to select a trust manifest (Yes branch of decision element 312), the process ends. Otherwise, trust management engine 13 may determine whether a trust manifest can be automatically generated using machine learning (step 314). If so, trust management engine 13 may generate a trust manifest for the compute resource using machine learning (step 316). Otherwise, trust management engine 13 may request the user to create a trust manifest for the compute resource (step 318). At step 320, trust management engine 13 may receive a trust manifest from the user.

Additional description is now provided for how trust management engine 13 may automatically create a new trust manifest for new product configurations based on learned patterns (e.g., past associations between compute resources and trust manifests). When generating a new manifest based on past good references (e.g., those marked as "isAuthorized"), predictions may be arrived upon by a combination of Bayes' theorem with strong naive independence (probability analysis), linear regression of least squares (future state prediction), and data points recursively adjusted for importance based on actions over time. A variety of information may be relied upon in order to form a prediction, including the information in inventory/context data datastore 16, CVE scans and known flaws, good known references, rules specified in a trust manifest, past user behavior and patterns (e.g., environmental changes, for example new versions of software) stored in patterns/policies datastore 18, integrity measurements from a compute resource located in a "clean room", and other metrics and metadata.

The following is an example of how trust management engine 13 would predict and create a new trust manifest for a new version of Tomcat software. In the example, 100 Docker containers run tomcat 6.0, and the Docker containers run on a hypervisor host. Further suppose that an administrator has created a trust manifest for tomcat 6.0. The Docker notary is configured to confirm the trust of each tomcat 6.0 image.

Over time, a few images are upgraded to tomcat 7.0. The trust management system predicts tomcat 7.0 to be more secure, creates a new trust manifest for tomcat 7.0, and deprecates the trust manifest for tomcat 6.0. The administrator accepts the trust manifest for tomcat 7.0; the trust manifest for tomcat 6.0 is deleted; thus, all the tomcat 6.0 containers become untrusted. It is important to note that while learning new patterns, not only versions but common practices and usual behavior are learned.

Subsequently, tomcat version 8.0 is released, and the trust management system detects and predicts version 8.0 to be more secure than version 7.0, since there are known security holes in version 7.0. The trust management system then creates a new trust manifest for tomcat 8.0, deletes the trust manifest for version 7.0 and updates the trust level computations for all 100 Docker containers. An administrator is notified of the updated trust level computations. There will be a rollback option just in case the administrator prefers the old tomcat versions, but this gives the administrator a chance to understand the environment their workloads are running in.

Importantly, trust management engine 13 is capable of predicting and learning secure strategies, practices, and patterns. The predicting and learning capabilities in combination with resource labels (e.g., trusted, untrusted, production, development, etc.) further increases the depth at which the trust management system can learn what types of containers, virtual machines, and hosts are indeed secure.

Another example is now provided regarding the generation of a new manifest corresponding to a newly instantiated virtual machine. In the current example, assume that trust management engine 13 is configured with hooks that allow use of the integrity measurement method of Intel CIT and the vulnerability scan of Clair. Further assume that the current state of trust manifest datastore 14 includes two manifests: one using Intel CIT configured for a bare-metal Dell host, one using Clair for CVE scans of containers. A virtual machine is instantiated on a bare-metal Dell host and a relying application 23 requests a trust level for the virtual machine.

Trust management engine 13 then parses through the trust manifests in trust manifest datastore 14 and does not find a compatible trust manifest. Trust management engine 13 then attempts to create a new trust manifest for this compute resource. Trust management engine 13 may determine that the compute resource is a virtual machine so it can parse through the configured integrity measurement technologies it has had configured up to this point. Clair will fail because it is not compatible with virtual machines. Intel CIT is compatible with some virtual machines. Trust management engine 13 will then attempt to attest the virtual machine with CIT, and upon success, it will create a trust manifest for the virtual machine.

The manifest would be created by trust management engine 13 with suitable resource meta data (e.g., virtual machine type, operating system information etc.). If an additional security assessment application such as hardening through HTCC or whitelisting were configured with the trust management engine 13, then such assessment checks would be added as well to the trust manifest. Suitable default rules would be added to the trust manifest. Default rules may be present in a comprehensive default trust manifest that exists for the resource type of virtual machines. A default rule could be determined to be suitable if the default rule relies upon measurements (e.g., integrity measurements, security assessments, etc.) that are supported by the newly instantiated virtual machine. This new manifest will not be authorized until an authorizing entity (e.g., an administrator 22, a third-party application such as HyTrust CloudControl, or the trust management system) authorizes this newly created trust manifest (e.g., sets "isAuthorized" attribute to true).

Another example is now provided regarding the generation of a new manifest corresponding to a newly added Hewlett-Packard™ (HP) bare-metal host. In the current example, assume that trust management engine 13 is configured with hooks that allow use of the integrity measurement method of Intel CIT. Further assume that the current state of trust manifest datastore 14 includes a manifest using Intel CIT configured for a hypervisor Dell host.

An HP bare-metal host is introduced and relying application 23 may request a trust level for the HP bare-metal host. Trust management engine 13 then parses through trust manifest datastore 14 and finds the manifest which is compatible with bare-metal hosts. Trust management engine 13 attempts to use the manifest but it fails because HP bare-metal hosts cannot use Intel CIT. Trust management engine 13 then attempts to create a manifest for this compute resource. Trust management engine 13 may determine that the compute resource is a bare-metal host and can interface with the bare-metal host. Trust management engine 13 then attempts to use bare-metal host capable integrity measurements such as UEFI and is successful. If, however, UEFI were not successful, trust management engine 13 would attempt other default bare-metal host specific methods or it would not be able to create a manifest and would terminate the manifest creation process.

A new manifest is created with the integrity measurement method set to UEFI. The manifest would be created with suitable resource metadata, including BIOS information, etc. If an additional security assessment applications such as hardening through HTCC or whitelisting were configured with trust management engine 13, then such assessment checks would be added as well. Suitable default rules would be added to the trust manifest. Default rules may be present in a comprehensive default trust manifest that exists for the resource type of bare-metal hosts. A default rule could be determined to be suitable if the default rule relies upon measurements (e.g., integrity measurements, security assessments, etc.) that are supported by the HP bare-metal host. This new manifest will not be authorized until an authorizing entity (e.g., an administrator 22, a third-party application such as HyTrust CloudControl, or the trust management system) authorizes this newly created trust manifest (e.g., sets "isAuthorized" attribute to true).

Figure 9:
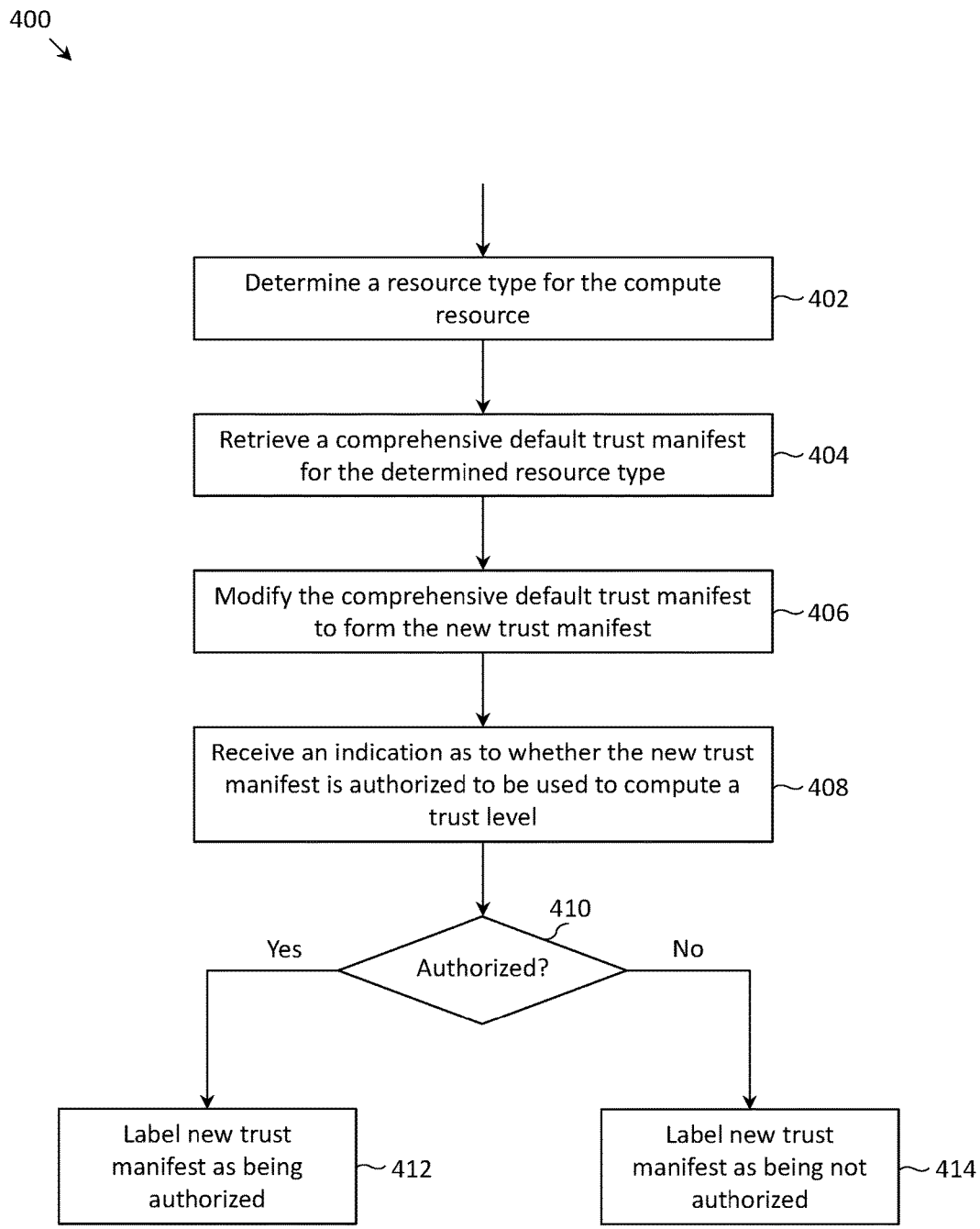
FIG. 9 depicts flowchart of a process for creating a new trust manifest, in accordance with one embodiment of the invention.

FIG. 9 depicts flowchart 400 of a process to create a new trust manifest for a compute resource (upon recognizing that no existing trust manifest can be used for the compute resource), in accordance with one embodiment of the invention. At step 402, trust management engine 13 may determine a resource type of compute resource 50 (e.g., bare-metal host, hypervisor host, virtual machine, container, etc.). For example, the resource type of compute resource 50 may be retrieved from inventory datastore 16.

At step 404, a comprehensive default trust manifest may be retrieved (e.g., from trust manifest datastore 14) for the determined resource type. In trust manifest datastore 14, there may be one comprehensive default trust manifest for each of the resource types (e.g., one comprehensive default trust manifest for bare-metal hosts, one comprehensive default trust manifest for hypervisor hosts, one comprehensive default trust manifest for virtual machines, one comprehensive default trust manifest for containers, etc.). The comprehensive default trust manifest may include all integrity measurement methods for the determined resource type known by the trust management system, all security assessment methods for the determined resource type known by the trust management system, all rule statements for the determined resource type known by the trust management system, and all action statements for the determined resource type known by the trust management system.

At step 406, trust management engine 13 may modify the comprehensive default trust manifest to form the new trust manifest. The modification may comprise removing one or more of the integrity measurement methods listed in the comprehensive default trust manifest that are determined to be not applicable for the compute resource. For example, integrity measurement methods could be removed depending on a vendor of the compute resource (e.g., TXT, and Open CIT measurement methods could be removed if the compute resource were an HP bare-metal host). The modification may comprise removing one or more of the security assessment methods listed in the comprehensive default trust manifest that are determined to be not applicable for the compute resource. For example, the operational context of the compute resource of "patient records" could result in the removal of security assessment methods related to PCI. The modification may comprise removing one or more of the rule statements listed in the comprehensive default trust manifest that are determined to be not applicable for the compute resource. For example, rule statements relying upon the number of CVEs detected by Qualys could be removed upon determining that Qualys is not supported by the compute resource. The modification may comprise removing one or more of the action statements listed in the comprehensive default trust manifest that are determined to be not applicable for the compute resource. For example, an action statement that reports the number of CVEs detected by Clair could be removed upon determining that Clair is not supported by the compute resource. The modification may also comprise inserting one or more attributes (e.g., the resource type) of the compute resource into the new trust manifest. Depending on the resource type, additional resource type specific attributes may be inserted as well. For example, for the resource type of virtual machine, additional attributes inserted into the new trust manifest may include a virtual machine type (e.g., VMware or AWS), a guest OS version (e.g., Windows 10), and where the virtual machine is running (e.g., on premises or in the cloud).

It is further noted that the comprehensive default trust manifests are typically manually created, and may be periodically updated as new technology or measurement methods, (e.g., new vulnerability scanners, etc.) become available. Further, comprehensive default trust manifests can be shortened upon determining the non-use or end-of-life of certain integrity measurement methods and/or security assessment methods. Additionally, the comprehensive default trust manifest may be customized by each organization. For example, an organization in the life sciences industry can remove vulnerability assessment methods that are specific to the finance industry from a comprehensive default trust manifest.

At step 408, trust management engine 13 may receive an indication, from administrator 22 or a security application as to whether the new trust manifest is authorized to be used to compute a trust level. Further, it is possible for trust management engine 13 to authorize the new trust manifest based on an internal process. If the new trust manifest is indicated as being authorized (Yes branch of 410), the new trust manifest is labeled as authorized (step 412). Otherwise (No branch of 410), the new trust manifest is labeled as being unauthorized (step 414).

It is noted that hooks 24, 26, 28 (e.g., adapters, plugins, etc.) are the means to connect with the various integrity measurement systems and other security assessment applications instantiated in aggregator 29 or compute resource 50. Each hook is specific to an integrity measurement system or a security assessment application and the hook needs to be suitably configured. The configuration of the hooks would be performed as part of the installation and configuration of the trust management system 12, and would involve providing information such as an IP address and service account credentials that are needed to connect to the integrity measurement and/or security assessment application.

Figure 10:
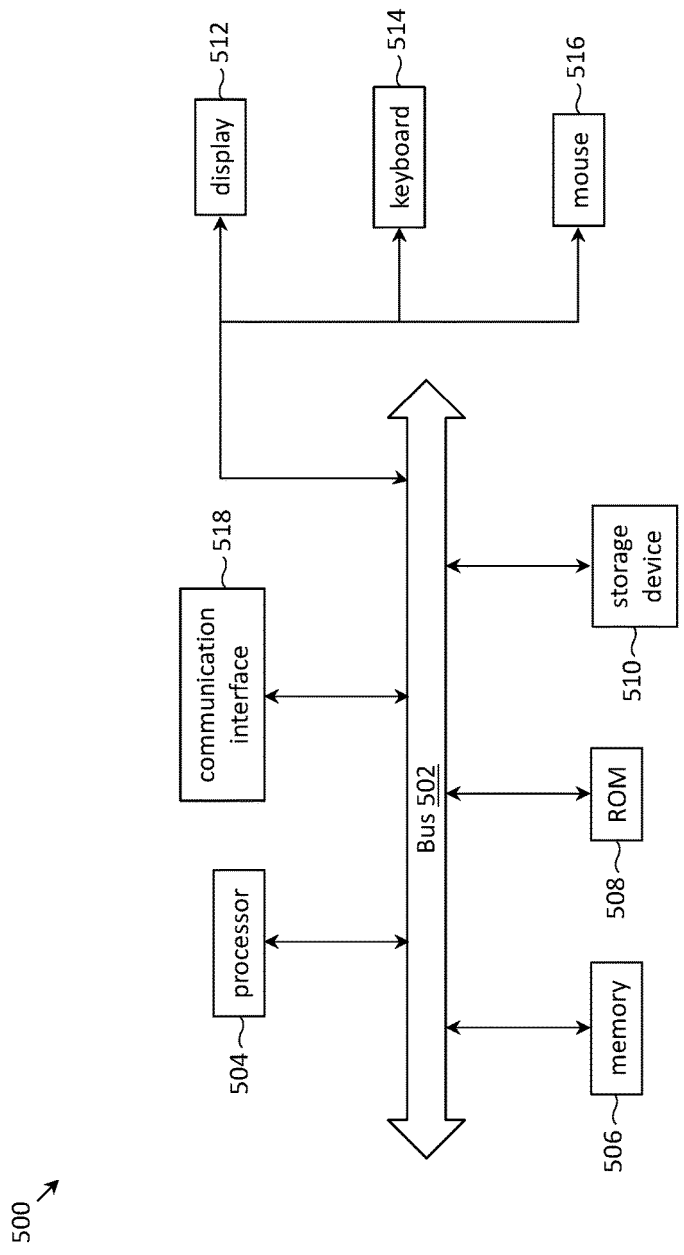
FIG. 10 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 10 provides an example of a system 500 that may be representative of any of the computing systems (e.g., trust management engine 13 and compute resource 50, etc.) discussed herein. Note, not all of the various computer systems have all of the features of system 500. For example, certain ones of the computer systems discussed above may not include a display inasmuch as the display function may be provided by a client computer communicatively coupled to the computer system or a display function may be unnecessary. Such details are not critical to the present invention.

System 500 includes a bus 502 or other communication mechanism for communicating information, and a processor 504 coupled with the bus 502 for processing information. Computer system 500 also includes a main memory 506, such as a random access memory (RAM) or other dynamic storage device, coupled to the bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to the bus 502 for storing static information and instructions for the processor 504. A storage device 510, for example a hard disk, flash memory-based storage medium, or other storage medium from which processor 504 can read, is provided and coupled to the bus 502 for storing information and instructions (e.g., operating systems, applications programs and the like).

Computer system 500 may be coupled via the bus 502 to a display 512, such as a flat panel display, for displaying information to a computer user. An input device 514, such as a keyboard including alphanumeric and other keys, may be coupled to the bus 502 for communicating information and command selections to the processor 504. Another type of user input device is cursor control device 516, such as a mouse, a trackpad, or similar input device for communicating direction information and command selections to processor 504 and for controlling cursor movement on the display 512. Other user interface devices, such as microphones, speakers, etc. are not shown in detail but may be involved with the receipt of user input and/or presentation of output.

The processes referred to herein may be implemented by processor 504 executing appropriate sequences of computer-readable instructions contained in main memory 506. Such instructions may be read into main memory 506 from another computer-readable medium, such as storage device 510, and execution of the sequences of instructions contained in the main memory 506 causes the processor 504 to perform the associated actions. In alternative embodiments, hard-wired circuitry or firmware-controlled processing units may be used in place of or in combination with processor 504 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 500 or similar electronic computing device, that manipulates and transforms data represented as physical (electronic) quantities within its registers and memories into other data similarly represented as physical quantities within its memories or registers or other such information storage, transmission or display devices.

Computer system 500 also includes a communication interface 518 coupled to the bus 502. Communication interface 518 may provide a two-way data communication channel with a computer network, which provides connectivity to and among the various computer systems discussed above. For example, communication interface 518 may be a local area network (LAN) card to provide a data communication connection to a compatible LAN, which itself is communicatively coupled to the Internet through one or more Internet service provider networks. The precise details of such communication paths are not critical to the present invention. What is important is that computer system 500 can send and receive messages and data through the communication interface 518 and in that way communicate with hosts accessible via the Internet. It is noted that the components of system 500 may be located in a single device or located in a plurality of physically and/or geographically distributed devices.

Thus, methods and systems for holistically attesting the trust of heterogeneous compute resources have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

APPENDIX A

```
"TrustManifest": {
    "name": "ManifestForBareMetalHost",
    "uid": x7587901011111,
    "description": "Trust Manifest for a Bare-metal Dell Host ",
    "isAuthorized": true,
    "resourceInfo": {
       "type": "BareMetalHost",
       "manufacturer": "Dell",
       "measurementAttributes": [
         {
         "name": "Bios",
         "value": "2.3",
         }
         {
         "name": "hostOS",
         "value": "CentOS",
         }
         {
         "name": "osVersion",
         "value": "7.1"
         }
       ]
    }
    "integrityMeasurementMechanism" {
       "methods": [
         {
            //The method used is UEFI. With this method, during booting of the system, the
            //digital signatures of the various binaries are verified. If the system boots successfully
            //it is deemed secured.
```

APPENDIX A-continued

```
            "methodName": "UEFI",
            "isPrimary": true,
            "frequency": "reboot",
            "metrics": [
                "name": "rebootTimes"
            ]
            }
            }
            {
            "methodName": "OpenCIT",
            "isPrimary": false,
            "frequency": "daily",
            "cryptoHashAlgorithm": "SHA-256",
            "metrics": [
                "name": "freshness"
            ]
            }
        ]
    }
    "additionalTrustworthinessInfo" {
        //Check if the specified system is on the allowed list of systems (whitelist).
        //The whitelisting mechanism used is through the product HTCC.
        "whitelistCheck" {
            "methodName": "HTCC",
        }
    }
    "trustLevelComputation" {
        //ruleProcessingMode specifies how the rule statements are to be processed.
        //If set to 'all' then the trust level is computed as an average of all the rule statements that
        //evaluate to true.
        //If set to 'and' then the trust level is set to Trusted if all rules succeed otherwise set to
        //unTrusted. The 'and' mode is for more stringent scenarios.
        "ruleProcessingMode": "all"
        //Each rule statement returns true or false upon processing.
        //If chain of Trust is set to 'none', the computation of the trust level will not rely on the
        //trustworthiness of the underlying compute resources (if any).
        //If chain of Trust is set to 'bottom-up', the trust level of the compute resource will be
        //equal to the minimum of the respective trust levels of the compute resource and its
        //underlying compute resource(s), and the chain of Trust is to be evaluated in a bottom-up
        //evaluation order.
        //If chain of Trust is set to 'top-down', the trust level of the compute resource will be
        //equal to the minimum of the respective trust levels of the compute resource and its
        //underlying compute resource(s), and the chain of Trust is to be evaluated in a top-down
        //evaluation order.
    "chainOfTrust": "none",
    "rules": [
        //This rule will check if the system was booted with UEFI turned on and that the
        //system booted successfully.
        "ruleStatement": "ensure the system securely booted",
        "ruleStatement": "ensure the system was rebooted within 14 days",
        "ruleStatement": "ensure the system is whitelisted"
    ]
    "actions": [
        //Each action statement performs an action once the measurement information is
        //collected and processed and the trust level is computed.
        //The following action statement updates the inventory database with the newly
        //computed trust level
        "actionStatement": "update inventory database with new trust level",
        //Default action is logging all the details of the trust level computation in the
        //internal repository.
        //The following action statement additionally logs all the details of processing the
        //trust manifest in an external log database.
        "actionStatement": "additionally log details of trust level computation in an
external repository",
        //Default action is to alert a default group of users.
        //The following action generates an alert and notifies select users thru e-mail if the
        //trust level falls below a certain threshold.
        "actionStatement": "Alert <user1, user2> if trust level < 50%"
    ]
    }
}
}
```

APPENDIX B

```
"TrustManifest": {
  "name": "ManifestForDellHypervisorHost",
  "uid": x8589901911xf,
  "description": "Trust Manifest for a Dell Host running ESXi Hypervisor",
  "isAuthorized": true,
  "resourceInfo": {
     "type": "HypervisorHost",
     "manufacturer": "Dell",
     "measurementAttributes": [
        {
        "name": "biosVersion",
        "value": "2.3",
        }
        {
        "name": "hypervisor",
        "value": "Vmware ESXi",
        }
        {
        "name": "vmmVersion",
        "value": "7.1"
        }
        {
        "name": "VIBs",
        "value": "esx-ui, esx-xserver"
        }
     ]
  }
  "integrityMeasurementMechanism" {
     "methods": [
        {
        //The method used is Open CIT. With this method, during booting of the system, the h/w
        //and s/w configuration of the system is measured and stored in the TPM as a digest. This
        //value is compared with good known reference values stored in the trust management
        //system database to establish the root of trust.
"methodName": "open CIT",
        "isPrimary": true,
        "frequency": "reboot",
        "cryptoHashAlgorithm": "SHA-256",
        "metrics": [
          "name": "freshness"
        ]
        }
        {
        //This is a backup method to use in case the primary fails.
          "methodName": "UEFI",
          "isPrimary": false,
          "frequency": "daily",
          "metrics": [
          "name": "freshness"
          ]
        }
     ]
  }
  "additionalTrustworthinessInfo" {
        //Check if the specified system is on the allowed list of systems (whitelist).
        //The whitelisting mechanism used is through the product HTCC.
     "whitelistCheck"{
          "methodName": "HTCC",
     }
  }
}
"trustLevelComputation" {
        //ruleProcessingMode specifies how the rule statements are to be processed.
        //If set to 'all' then the trust level is computed as an average of all the rule statements that
        //evaluate to true.
        //If set to 'and' then the trust level is set to Trusted if all rules succeed otherwise set to
        //unTrusted. The 'and' mode is for more stringent scenarios.
        "ruleProcessingMode": "all"
        //Each rule statement returns true or false upon processing.
        //If chain of Trust is set to 'none', the computation of the trust level will not rely on the
        //trustworthiness of the underlying compute resources (if any).
        //If chain of Trust is set to 'bottom-up', the trust level of the compute resource will be
        //equal to the minimum of the respective trust levels of the compute resource and its
        //underlying compute resource(s), and the chain of Trust is to be evaluated in a bottom-up
        //evaluation order.
```

APPENDIX B-continued

```
        //If chain of Trust is set to 'top-down', the trust level of the compute resource will be
        //equal to the minimum of the respective trust levels of the compute resource and its
        //underlying compute resource(s), and the chain of Trust is to be evaluated in a top-down
        //evaluation order.
        "chainOfTrust": "none",
        "rules": [
                "ruleStatement": "ensure the integrity measurement matches the good known
value",
                "ruleStatement": "ensure the freshness of the integrity measurement by checking
if the system was rebooted within 7 days",
                "ruleStatement": "ensure the system is whitelisted"
        ]
        "actions": [
              //Each action statement performs an action once the measurement information is
              //collected and processed and the trust level is computed. The following action
              //statement updates the inventory database with the newly computed trust level.
              "actionStatement": "update inventory database with new trust level",
              //Default action is logging all the details of the trust level computation in the
              //internal repository.
              //The following action statement additionally logs all the details of processing the
              //trust manifest in an external log database.
              "actionStatement": "additionally log details of trust level computation in an
external repository",
              //Default action is to alert a default group of users.
              //The following action generates an alert and notifies select users thru e-mail if the
              //trust level falls below a certain threshold.
              "actionStatement": "Alert <user1, user2> if trust level < 50%"
        ]
    }
}
```

APPENDIX C

```
"TrustManifest": {
  "name": "ManifestForvSphereVM",
  "uid": x9589941911xt,
  "description": "Trust Manifest for a Linux VM running on a ESXi Hypervisor Host",
  "isAuthorized": true,
  "resourceInfo": {
     "type": "VM",
     "vmType": "vSphere",
     "measurementAttributes": [
        {
        "name": "osName",
        "value": "CentOS",
        }
        {
        "name": "osVersion",
        "value": "7.0",
        }
     ]
   }
   "integrityMeasurementMechanism" {
     "methods": [
       {
         //The method used is Open CIT. With this method, during booting of the system, the s/w
         //configuration of the VM is measured and compared with good known reference values
         //stored in the trust management system database to establish the root of trust.
       "methodName": "open CIT",
         "isPrimary": true,
         "frequency": "start, reboot"
         "cryptoHashAlgorithm": "SHA-256",
         "metrics": [
            "name": "freshness"
         ]
       }
     ]
   }
   "additionalTrustworthinessInfo"{
         //scan for vulnerabilities (CVEs). Look for high severity CVEs
         "vulnerabilityCheck"{
            "methodName": "Qualys",
            "metrics": [
               "name": "highSeverityCVEs"
            ]
         }
```

APPENDIX C-continued

```
        //Check if the specified system is on the allowed list of systems (whitelist).
        //The whitelisting mechanism used is through the product HTCC.
      "whitelistCheck"{
          "methodName": "HTCC",
      }
    }
  }
"trustLevelComputation"{
        //ruleProcessingMode specifies how the rule statements are to be processed.
        //If set to 'all' then the trust level is computed as an average of all the rule statements that
        //evaluate to true.
        //If set to 'and' then the trust level is set to Trusted if all rules succeed otherwise set to
        //unTrusted. The 'and' mode is for more stringent scenarios.
        "ruleProcessingMode": "all"
        //Each rule statement returns true or false upon processing.
        //If chain of Trust is set to 'none', the computation of the trust level will not rely on the
        //trustworthiness of the underlying compute resources (if any)
        //If chain of Trust is set to 'bottom-up', the trust level of the compute resource will be
        //equal to the minimum of the respective trust levels of the compute resource and its
        //underlying compute resource(s), and the chain of Trust is to be evaluated in a bottom-up
        //evaluation order.
        //If chain of Trust is set to 'top-down', the trust level of the compute resource will be
        //equal to the minimum of the respective trust levels of the compute resource and its
        //underlying compute resource(s), and the chain of Trust is to be evaluated in a top-down
        //evaluation order.
        //In this case, the trust manifest will instruct the trust management system to calculate the
        //trust level of the virtual machine as the minimum of the trust level of the hypervisor
        //host on which the virtual machine runs and the trust level of the virtual machine (when
        //computed independently from the trustworthiness of the underlying hypervisor host).
        "chainOfTrust": "bottom-up",
        "rules": [
            "ruleStatement": "ensure the integrity measurement for the VM image matches
the good known value",
            "ruleStatement": "ensure the freshness of the integrity measurement by checking
if the system was rebooted within 7 days",
            "ruleStatement": "ensure the system is whitelisted",
            "ruleStatement": "Verify the results of the vulnerability scan to ensure there are
no more than 3 high severity CVEs"
        ]
        "actions": [
            //Each action statement performs an action once the measurement information is
            //collected and processed and the trust level is computed.
            //The following action statement updates the inventory database with the newly
            //computed trust level.
            "actionStatement": "update inventory database with new trust level",
            //Default action is logging all the details of the trust level computation in the
            //internal repository.
            //The following action statement additionally logs all the details of processing the
            //trust manifest in an external log database.
            "actionStatement": "additionally log details of trust level computation in an
external repository",
            //Default action is to alert a default group of users.
            //The following action generates an alert and notifies select users thru e-mail if the
            //trust level falls below a certain threshold.
            "actionStatement": "Alert <user1, user2> if trust level < 50%"
            //The following action takes the step of shutting down the VM if the
            //trustlevel is 0
            "actionStatement": "if trustLevel is 0% then Shutdown VM"
        ]
    }
}
```

APPENDIX D

```
"TrustManifest": {
  "name": "ManifestForDockerContainer",
  "uid": x9589941511vt,
  "description": "Trust Manifest for a Docker container running Tomcat software",
  "isAuthorized": true,
  "resourceInfo": {
    "type": "Container",
    "containerType": "Docker",
    "measurementAttributes": [
      {
```

APPENDIX D-continued

```
        //the repository name and tag value determine the Docker image
        "name": "repoName",
        "value": "tomcat",
        }
        {
        "name": "tag",
        "value": "7.0",
        }
      ]
    }
    "integrityMeasurementMechanism"{
        "methods": [
            {
                //The method used is Docker Notary. This method simply checks if the image is signed.
                "methodName": "Docker Notary",
                "isPrimary": true,
                "frequency": "start, daily"
                "metrics": [
                  "name": "isSigned"
                ]
            }
        ]
    }
    "additionalTrustworthinessInfo" {
        //scan for vulnerabilities (CVEs) using Clair software. Look for high severity CVEs
        "vulnerabilityCheck"{
            "methodName": "Clair",
            "metrics": [
                "name": "highSeverityCVEs"
            ]
        }
        //Check if the specified system is on the allowed list of systems (whitelist).
        //The whitelisting mechanism used is through the product HTCC.
        "whitelistCheck"{
            "methodName": "HTCC",
        }
    }
"trustLevelComputation"{
        //ruleProcessingMode specifies how the rule statements are to be processed.
        //If set to 'all' then the trust level is computed as an average of all the rule statements that
        //evaluate to true.
        //If set to 'and' then the trust level is set to Trusted if all rules succeed otherwise set to
        //unTrusted. The 'and' mode is for more stringent scenarios.
        "ruleProcessingMode": "all"
        //Each rule statement returns true or false upon processing.
        //If chain of Trust is set to 'none', the computation of the trust level will not rely on the
        //trustworthiness of the underlying compute resources (if any).
        //If chain of Trust is set to 'bottom-up', the trust level of the compute resource will be
        //equal to the minimum of the respective trust levels of the compute resource and its
        //underlying compute resource(s), and the chain of Trust is to be evaluated in a bottom-up
        //evaluation order.
        //If chain of Trust is set to 'top-down', the trust level of the compute resource will be
        //equal to the minimum of the respective trust levels of the compute resource and its
        //underlying compute resource(s), and the chain of Trust is to be evaluated in a top-down
        //evaluation order.
        //In this case, the manifest instructs the trust management engine to calculate the trust
        //level of the container as the minimum of the trust level of the container (when computed
        //independently of the underlying compute resources) and the trust level(s) of the
        //compute resource(s) on which the container runs. A container could run on the guest o/s
        //of a VM or directly on the host o/s of a bare-metal host.
        "chainOfTrust": "bottom-up",
        "rules": [
            "ruleStatement": "ensure the Docker image is signed",
            "ruleStatement": "ensure the system is whitelisted",
            "ruleStatement": "Verify the results of the vulnerability scan to ensure there are
no more than 3 high severity CVEs"
        ]
        "actions": [
            //Each action statement performs an action once the measurement information is
            //collected and processed and the trust level is computed. The following action
            //statement updates the inventory database with the newly computed trust level.
            "actionStatement": "update inventory database with new trust level",
            //Default action is logging all the details of the trust level computation in the
            //internal repository.
            //The following action statement additionally logs all the details of processing the
            //trust manifest in an external log database.
            "actionStatement": "additionally log details of trust level computation in an
```

APPENDIX D-continued

```
external repository",
        //Default action is to alert a default group of users.
        //The following action generates an alert and notifies select users thru e-mail if the
        //trust level falls below a certain threshold.
        "actionStatement": "Alert <user1, user2> if trust level < 80%",
        //The following action takes the step of shutting down the container if the
        //trustlevel is < than 50%
        "actionStatement": "if trustLevel < 50% stop container"
    ]
  }
}
```

What is claimed is:

1. A method, comprising:

selecting, by a trust management engine of a trust management system, a trust manifest for a compute resource communicatively coupled to and under evaluation by the trust management system, the trust manifest selected from a plurality of candidate trust manifests based on a context in which the compute resource is utilized by an organization, and a closeness in match between one or more attributes of candidate ones of the plurality of trust manifests and one or more attributes of the compute resource, wherein the selection of the trust manifest increases a rating of the trust manifest, the rating based on at least one of a frequency of use of the trust manifest, a count of a number of times the trust manifest was used, or how recently the trust manifest was used, wherein the selection of a trust manifest is further based on the rating associated with each of the trust manifests, thereby the selection of the trust manifest resulting in a behavior of the trust management system being modified;

upon having selected the trust manifest, the trust management engine subsequently executing a plurality of rule statements specified in the selected trust manifest and through said execution of said rule statements, thereby determining a trust level of the compute resource based on (i) one or more integrity measurements of the compute resource, said integrity measurements determined in accordance with one or more integrity measurement methods specified in the selected trust manifest, and (ii) one or more security assessments of the compute resource, said security assessments being determined in accordance with one or more security assessment methods specified in the selected trust manifest; and storing, in an inventory datastore, information concerning the selected trust manifest, information concerning the determined trust level, and information concerning the compute resource.

2. The method of claim 1, wherein the compute resource is one of a bare-metal host, a hypervisor host, a virtual machine or a container.

3. The method of claim 1, wherein the one or more attributes of the compute resource includes a compute resource type specifying whether the compute resource is a bare-metal host, a hypervisor host, a virtual machine or a container.

4. The method of claim 1, wherein a freshness indicator is associated with at least one of the one or more integrity measurements, the freshness indicator indicating an age of the one or more integrity measurements.

5. The method of claim 4, wherein determining the trust level of the compute resource comprises comparing the freshness indicator to a threshold.

6. A trust management system comprising a processor, a memory and a data storage device, the data storage device storing instructions that, when executed by the processor, cause the processor to:

select a trust manifest for a compute resource communicatively coupled to and under evaluation by the trust management system, the trust manifest selected from a plurality of candidate trust manifests based on a context in which the compute resource is utilized by an organization, and a closeness in match between one or more attributes of candidate ones of the plurality of trust manifests and one or more attributes of the compute resource, wherein the selection of the trust manifest increases a rating of the trust manifest, the rating based on at least one of a frequency of use of the trust manifest, a count of a number of times the trust manifest was used, or how recently the trust manifest was used, wherein the selection of a trust manifest is further based on the rating associated with each of the trust manifests, thereby the selection of the trust manifest resulting in a behavior of the trust management system being modified;

upon having selected the trust manifest, execute a plurality of rule statements specified in the selected trust manifest and through said execution of said rule statements, thereby determining a trust level of the compute resource based on (i) one or more integrity measurements of the compute resource, said integrity measurements determined in accordance with one or more integrity measurement methods specified in the selected trust manifest, and (ii) one or more security assessments of the compute resource, said security assessments being determined in accordance with one or more security assessment methods specified in the selected trust manifest; and store, in an inventory datastore, information concerning the selected trust manifest, information concerning the determined trust level, and information concerning the compute resource.

7. The trust management system of claim 6, wherein the one or more security assessment methods comprise at least one of a vulnerability assessment method, a whitelist assessment method, or a method for assessing whether the compute resource is hardened.

8. The trust management system of claim 6, wherein determining the trust level of the compute resource comprises determining whether at least one of the one or more integrity measurements matches a good known value.

9. The trust management system of claim 6, wherein the one or more security assessment methods comprises one or more vulnerability assessment methods, and wherein determining the trust level of the compute resource comprises counting a number of vulnerabilities identified by the one or more vulnerability assessment methods and comparing the number of vulnerabilities to a threshold.

10. A non-transitory machine-readable storage medium comprising software instructions that, when executed by a processor of a trust management system, cause the processor to:
- select a trust manifest for a compute resource communicatively coupled to and under evaluation by the trust management system, the trust manifest selected from a plurality of candidate trust manifests based on a context in which the compute resource is utilized by an organization, and a closeness in match between one or more attributes of candidate ones of the plurality of trust manifests and one or more attributes of the compute resource, wherein the selection of the trust manifest increases a rating of the trust manifest, the rating based on at least one of a frequency of use of the trust manifest, a count of a number of times the trust manifest was used, or how recently the trust manifest was used, wherein the selection of a trust manifest is further based on the rating associated with each of the trust manifests, thereby the selection of the trust manifest resulting in a behavior of the trust management system being modified;
- upon having selected the trust manifest, execute a plurality of rule statements specified in the selected trust manifest and through said execution of said rule statements, thereby determining a trust level of the compute resource based on (i) one or more integrity measurements of the compute resource, said integrity measurements determined in accordance with one or more integrity measurement methods specified in the selected trust manifest, and (ii) one or more security assessments of the compute resource, said security assessments being determined in accordance with one or more security assessment methods specified in the selected trust manifest; and
- store, in an inventory datastore, information concerning the selected trust manifest, information concerning the determined trust level, and information concerning the compute resource.

11. The method non-transitory machine-readable storage medium of claim 10, further comprising software instructions that cause the processor to, if the trust manifest indicates that chain of trust is enabled, determine the trust level of the compute resource based on a trust level of one or more underlying compute resources that the compute resource depends on.

12. The non-transitory machine-readable storage medium of claim 11, wherein the one or more underlying compute resources that the compute resource depends on is determined based on inventory data associated with the compute resource, the inventory data specifying a hierarchy of the compute resource.

13. The non-transitory machine-readable storage medium of claim 11, further comprising software instructions that cause the processor to, if the trust manifest indicates that chain of trust is enabled, determine the trust level of the compute resource to be the minimum of an isolated trust level of the compute resource and respective trust levels of the one or more underlying compute resources that the compute resource depends on.

14. A method, comprising:
- selecting, by a trust management engine of a trust management system, a trust manifest for a compute resource communicatively coupled to and under evaluation by the trust management system, the trust manifest selected from a plurality of candidate trust manifests based on a context in which the compute resource is utilized by an organization, and a closeness in match between one or more attributes of candidate ones of the plurality of trust manifests and one or more attributes of the compute resource;
- upon having selected the trust manifest, the trust management engine subsequently executing a plurality of rule statements specified in the selected trust manifest and through said execution of said rule statements, thereby determining a trust level of the compute resource based on (i) one or more integrity measurements of the compute resource, said integrity measurements determined in accordance with one or more integrity measurement methods specified in the selected trust manifest, and (ii) one or more security assessments of the compute resource, said security assessments being determined in accordance with one or more security assessment methods specified in the selected trust manifest;
- storing, in an inventory datastore, information concerning the selected trust manifest, information concerning the determined trust level, and information concerning the compute resource;
- determining a resource type of the compute resource;
- retrieving a comprehensive default trust manifest for the determined resource type, the comprehensive default trust manifest including all integrity measurement methods for the determined resource type known by the trust management system, all security assessment methods for the determined resource type known by the trust management system, all rule statements for the determined resource type known by the trust management system, and all action statements for the determined resource type known by the trust management system;
- modifying the comprehensive default trust manifest to form the candidate trust manifest, the modification comprising one or more of:
  (i) removing one or more of the integrity measurement methods included in the comprehensive default trust manifest determined to be not applicable for the compute resource;
  (ii) removing one or more of the security assessment methods included in the comprehensive default trust manifest determined to be not applicable for the compute resource;
  (iii) removing one or more of the rule statements included in the comprehensive default trust manifest determined to be not applicable for the compute resource;
  (iv) removing one or more of the action statements included in the comprehensive default trust manifest determined to be not applicable for the compute resource; and
  (v) inserting one or more attributes of the compute resource into the candidate trust manifest, the one or more attributes including at least the resource type of the compute resource;
- receiving an indication, from an administrator or a security application, as to whether the candidate trust manifest is authorized to be used to compute a trust level; and
- if the candidate trust manifest is indicated as being authorized, labeling the candidate trust manifest as being authorized; otherwise, labeling the candidate trust manifest as being not authorized.

15. The method of claim 14, further comprising:
logging the one or more integrity measurements and the one or more security assessments of the compute resource; and
reporting the trust level with the one or more integrity measurements and the one or more security assessments of the compute resource.

16. The method of claim 14, wherein a time-to-live parameter is associated with the determined trust level, and further comprising re-determining the trust level in response to an age of the trust level exceeding the time-to-live parameter.

17. The method of claim 14, wherein the context includes at least one of a business value of the compute resource and whether the compute resource needs to comply with an industry regulation.

18. The method of claim 14, further comprising modifying one or more of a behavior of the trust management engine, a behavior of the compute resource, or an operational environment within which the compute resource operates based on at least one of the determined trust level or the selection of the trust manifest.

19. A trust management system comprising a processor, a memory and a data storage device, the data storage device storing instructions that, when executed by the processor, cause the processor to:
select a trust manifest for a compute resource communicatively coupled to and under evaluation by the trust management system, the trust manifest selected from a plurality of candidate trust manifests based on a context in which the compute resource is utilized by an organization, and a closeness in match between one or more attributes of candidate ones of the plurality of trust manifests and one or more attributes of the compute resource;
upon having selected the trust manifest, execute a plurality of rule statements specified in the selected trust manifest and through said execution of said rule statements, thereby determining a trust level of the compute resource based on (i) one or more integrity measurements of the compute resource, said integrity measurements determined in accordance with one or more integrity measurement methods specified in the selected trust manifest, and (ii) one or more security assessments of the compute resource, said security assessments being determined in accordance with one or more security assessment methods specified in the selected trust manifest;
store, in an inventory datastore, information concerning the selected trust manifest, information concerning the determined trust level, and information concerning the compute resource;
determine a resource type of the compute resource;
retrieve a comprehensive default trust manifest for the determined resource type, the comprehensive default trust manifest including all integrity measurement methods for the determined resource type known by the trust management system, all security assessment methods for the determined resource type known by the trust management system, all rule statements for the determined resource type known by the trust management system, and all action statements for the determined resource type known by the trust management system;
modify the comprehensive default trust manifest to form the candidate trust manifest, the modification comprising one or more of:
(i) removing one or more of the integrity measurement methods included in the comprehensive default trust manifest determined to be not applicable for the compute resource;
(ii) removing one or more of the security assessment methods included in the comprehensive default trust manifest determined to be not applicable for the compute resource;
(iii) removing one or more of the rule statements included in the comprehensive default trust manifest determined to be not applicable for the compute resource;
(iv) removing one or more of the action statements included in the comprehensive default trust manifest determined to be not applicable for the compute resource; and
(v) inserting one or more attributes of the compute resource into the candidate trust manifest, the one or more attributes including at least the resource type of the compute resource;
receive an indication, from an administrator or a security application, as to whether the candidate trust manifest is authorized to be used to compute a trust level; and
if the candidate trust manifest is indicated as being authorized, label the candidate trust manifest as being authorized; otherwise, label the candidate trust manifest as being not authorized.

20. The trust management system of claim 19, wherein the trust level is computed as a Boolean AND of a truth value evaluated for each of the rule statements.

21. The trust management system of claim 19, wherein the trust level is computed as a Boolean OR of a truth value evaluated for each of the rule statements.

22. The trust management system of claim 19, wherein the trust level is computed as an average of the one or more rule statements that evaluates to true.

23. A non-transitory machine-readable storage medium comprising software instructions that, when executed by a processor of a trust management system, cause the processor to:
select a trust manifest for a compute resource communicatively coupled to and under evaluation by the trust management system, the trust manifest selected from a plurality of candidate trust manifests based on a context in which the compute resource is utilized by an organization, and a closeness in match between one or more attributes of candidate ones of the plurality of trust manifests and one or more attributes of the compute resource;
upon having selected the trust manifest, execute a plurality of rule statements specified in the selected trust manifest and through said execution of said rule statements, thereby determining a trust level of the compute resource based on (i) one or more integrity measurements of the compute resource, said integrity measurements determined in accordance with one or more integrity measurement methods specified in the selected trust manifest, and (ii) one or more security assessments of the compute resource, said security assessments being determined in accordance with one or more security assessment methods specified in the selected trust manifest;
store, in an inventory datastore, information concerning the selected trust manifest, information concerning the determined trust level, and information concerning the compute resource;

determine a resource type of the compute resource;
retrieve a comprehensive default trust manifest for the determined resource type, the comprehensive default trust manifest including all integrity measurement methods for the determined resource type known by the trust management system, all security assessment methods for the determined resource type known by the trust management system, all rule statements for the determined resource type known by the trust management system, and all action statements for the determined resource type known by the trust management system;
modify the comprehensive default trust manifest to form the candidate trust manifest, the modification comprising one or more of:
  (i) removing one or more of the integrity measurement methods included in the comprehensive default trust manifest determined to be not applicable for the compute resource;
  (ii) removing one or more of the security assessment methods included in the comprehensive default trust manifest determined to be not applicable for the compute resource;
  (iii) removing one or more of the rule statements included in the comprehensive default trust manifest determined to be not applicable for the compute resource;
  (iv) removing one or more of the action statements included in the comprehensive default trust manifest determined to be not applicable for the compute resource; and
  (v) inserting one or more attributes of the compute resource into the candidate trust manifest, the one or more attributes including at least the resource type of the compute resource;
receive an indication, from an administrator or a security application, as to whether the candidate trust manifest is authorized to be used to compute a trust level; and
if the candidate trust manifest is indicated as being authorized, label the candidate trust manifest as being authorized; otherwise, label the candidate trust manifest as being not authorized.

24. The non-transitory machine-readable storage medium of claim 23, further comprising software instructions that cause the processor to, wherein in response to the trust level being greater than or equal to a threshold, alert a first group of users; otherwise, in response to the trust level being less than the threshold, alert a second group of user, thereby modifying the behavior of the trust management engine based on the trust level.

25. The non-transitory machine-readable storage medium of claim 23, further comprising software instructions that cause the processor to, in response to the trust level being greater than or equal to a threshold, allow continued operation of the compute resource; otherwise, in response to the trust level being less than the threshold, terminate an operation of the compute resource, thereby modifying a behavior of the compute resource.

26. The non-transitory machine-readable storage medium of claim 23, wherein the selected trust manifest instructs the trust management engine to log details of the trust computation in a datastore external from the trust management system.

27. The non-transitory machine-readable storage medium of claim 23, further comprising software instructions that cause the processor to, in response to the trust level being greater than or equal to a threshold, place the compute resource in a production environment; otherwise, in response to the trust level being less than the threshold, place the compute resource in a development environment.

* * * * *